US012749982B2

(12) United States Patent
Cao et al.

(10) Patent No.: US 12,749,982 B2
(45) Date of Patent: Sep. 29, 2026

(54) TRAPEZOIDAL CURRENT CONTROL IN ELECTRONIC TRANSFORMERS

(71) Applicant: VIRGINIA TECH INTELLECTUAL PROPERTIES, INC., Blacksburg, VA (US)

(72) Inventors: Yuliang Cao, Blacksburg, VA (US); Dong Dong, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 219 days.

(21) Appl. No.: 18/364,088

(22) Filed: Aug. 2, 2023

(65) Prior Publication Data

US 2025/0047206 A1 Feb. 6, 2025

(51) Int. Cl.

| | |
|---|---|
| ***H02M 3/335*** | (2006.01) |
| ***H02M 1/00*** | (2006.01) |
| ***H02M 3/00*** | (2006.01) |

(52) U.S. Cl.
CPC ..... *H02M 3/33515* (2013.01); *H02M 1/0043* (2021.05); *H02M 1/0058* (2021.05); *H02M 3/01* (2021.05); *H02M 3/33573* (2021.05)

(58) Field of Classification Search
CPC ........... H02M 1/0058; H02M 3/33515; H02M 3/33573
See application file for complete search history.

(56) References Cited

U.S. PATENT DOCUMENTS

| | | | | |
|---|---|---|---|---|
| 5,481,449 | A | 1/1996 | Kheraluwala et al. | |
| 6,178,098 | B1 * | 1/2001 | He .................... | H02M 3/33561 363/90 |
| 8,193,788 | B2 | 6/2012 | Chapman | |
| 9,887,627 | B2 * | 2/2018 | Erickson, Jr ............ | H02S 20/25 |
| 10,186,977 | B2 | 1/2019 | Yamaoka et al. | |
| 10,404,182 | B1 | 9/2019 | Abdel-Rahman | |

(Continued)

OTHER PUBLICATIONS

Final Office Action in U.S. Appl. No. 17/819,383, mailed Feb. 1, 2024.

(Continued)

*Primary Examiner* — Gary L Laxton
(74) *Attorney, Agent, or Firm* — Perilla Knox & Hildebrandt LLP; Jason M. Perilla

(57) ABSTRACT

Power converters including electronic-embedded transformers for current sharing and load-independent voltage gain are described. An example power converter system includes an input, an output, a power converter between the input and output, and a controller. The converter includes a first bridge, a second bridge, and an electronic-embedded transformer (EET) between the first and second bridge. The EET includes a capacitor and a capacitance coupling switch bridge. The controller generates phasing drive control signals for trapezoidal current modulation control of the capacitance coupling switch bridge of the EET. The controller is configured to generate the phasing drive control signals based on a phase shift coefficient, k, to set a duty cycle of a voltage from the capacitance coupling switch bridge. The (Continued)

controller is also configured to vary k from between 0 to 0.5 based on a load applied to the power converter system or other operating aspects of the power converter.

18 Claims, 22 Drawing Sheets

(56) References Cited

U.S. PATENT DOCUMENTS

| | | | |
|---|---|---|---|
| 10,498,247 B2 | 12/2019 | Murakami | |
| 11,021,069 B1 | 6/2021 | Elshaer et al. | |
| 11,088,625 B1 | 8/2021 | Cao et al. | |
| 11,201,551 B2 | 12/2021 | Mariéthoz et al. | |
| 11,539,300 B1 | 12/2022 | Wu et al. | |
| 2005/0083714 A1 | 4/2005 | Zhu et al. | |
| 2006/0268589 A1 | 11/2006 | Nakahori | |
| 2012/0153729 A1 | 6/2012 | Song et al. | |
| 2012/0163035 A1 | 6/2012 | Song et al. | |
| 2014/0225439 A1 | 8/2014 | Mao | |
| 2015/0049518 A1 | 2/2015 | Harrison et al. | |
| 2015/0326141 A1* | 11/2015 | Takahashi | H01F 30/00 363/126 |
| 2016/0099646 A1 | 4/2016 | Safaee et al. | |
| 2016/0111965 A1 | 4/2016 | Wang et al. | |
| 2017/0063251 A1 | 3/2017 | Ye et al. | |
| 2017/0358996 A1 | 12/2017 | Higaki et al. | |
| 2018/0102644 A1 | 4/2018 | Perreault et al. | |
| 2018/0248468 A1 | 8/2018 | Ying et al. | |
| 2019/0052177 A1 | 2/2019 | Lu et al. | |
| 2019/0058409 A1 | 2/2019 | Ishibashi et al. | |
| 2019/0252989 A1 | 8/2019 | Toliyat et al. | |
| 2019/0288606 A1 | 9/2019 | Higaki et al. | |
| 2019/0296650 A1 | 9/2019 | Wang et al. | |
| 2019/0355506 A1 | 11/2019 | Fei et al. | |
| 2020/0052604 A1 | 2/2020 | Tayebi et al. | |
| 2020/0076311 A1 | 3/2020 | Bortis et al. | |
| 2020/0091838 A1 | 3/2020 | Wada et al. | |
| 2020/0144926 A1 | 5/2020 | Murakami | |
| 2020/0177089 A1 | 6/2020 | Abdel-Rahman | |
| 2020/0195156 A1 | 6/2020 | Kado et al. | |
| 2020/0212816 A1 | 7/2020 | Sun et al. | |
| 2020/0321878 A1 | 10/2020 | Zhang et al. | |
| 2021/0083589 A1 | 3/2021 | Dong et al. | |
| 2021/0083590 A1 | 3/2021 | Lu et al. | |
| 2021/0099097 A1 | 4/2021 | Zhang | |
| 2021/0111629 A1 | 4/2021 | Gray et al. | |
| 2021/0155100 A1 | 5/2021 | Khaligh et al. | |
| 2021/0408927 A1 | 12/2021 | Zhang et al. | |
| 2022/0045628 A1 | 2/2022 | Chen et al. | |
| 2022/0123661 A1 | 4/2022 | Ishibashi et al. | |
| 2022/0161673 A1 | 5/2022 | Jimenez Pino et al. | |
| 2022/0216805 A1 | 7/2022 | Itogawa et al. | |
| 2022/0345046 A1 | 10/2022 | Wang et al. | |
| 2022/0385087 A1 | 12/2022 | Sarnago Andia et al. | |
| 2022/0385198 A1* | 12/2022 | Lou | H02M 3/33571 |
| 2022/0393606 A1 | 12/2022 | Itogawa et al. | |
| 2022/0416672 A1 | 12/2022 | Zhuang et al. | |
| 2023/0017288 A1 | 1/2023 | Chen et al. | |
| 2023/0261568 A1 | 8/2023 | Liu et al. | |
| 2023/0335335 A1 | 10/2023 | Tange | |
| 2023/0361671 A1 | 11/2023 | Ou et al. | |
| 2023/0387816 A1 | 11/2023 | Mallik et al. | |
| 2023/0402927 A1 | 12/2023 | Kawai | |

OTHER PUBLICATIONS

Notice of Allowance for U.S. Appl. No. 17/819,353 mailed Jul. 2, 2024.

Office Action in U.S. Appl. No. 18/364,113 mailed May 19, 2025.

B. Zhao, Q. Song, W. Liu, and Y. Sun, "Overview of Dual-Active-Bridge Isolated Bidirectional DC-DC Converter forHigh-Frequency-Link Power-Conversion System," IEEE Transactions on Power Electronics, vol. 29, No. 8, pp. 4091-4106, Aug. 2014.

C. Zhao, Y.-H. Hsieh, F. C. Lee and Q. Li, "Design and Analysis of a High-frequency CLLC Resonant Converter with Medium Voltage insulation for Solid-State-Transformer," 2021 IEEE Applied Power Electronics Conference andExposition (APEC), 2021, pp. 1638-1642.

D. Dong, M. Agamy, J. Z. Bebic, Q. Chen and G. Mandrusiak, "A Modular SiC High-Frequency Solid-State Transformer for Medium-Voltage Applications: Design, Implementation, and Testing," in IEEE Journal of Emerging andSelected Topics in Power Electronics, vol. 7, No. 2, pp. 768-778, Jun. 2019.

D. Dong, R. Raju, G. Ganireddy and M. Agamy, "A Rotational Control in Medium-Voltage Modular Solid-StateTransformer-Based Converter System," in IEEE Transactions on Industry Applications, vol. 55, No. 6, pp. 6223-6233,Nov.-Dec. 2019.

D. Rothmund, T. Guillod, D. Bortis, and J. W. Kolar, "99% Efficient 10 kV SiC-Based 7 kV/400 V DC Transformer forFuture Data Centers," IEEE J. Emerg. Sel. Topics Power Electron., vol. 7, No. 2, pp. 753-767, Jun. 2019.

F. Jin, A. Nabih, C. Chen, X. Chen, Q. Li and F. C. Lee, "A High Efficiency High Density DC/DC Converter for BatteryCharger Applications," 2021 IEEE Applied Power Electronics Conference and Exposition (APEC), 2021, pp. 1767-1774.

J. Liu, L. Ravi, D. Dong and R. Burgos, "A Single Passive Gate-Driver for Series-Connected Power Devices in DCCircuit Breaker Applications," in IEEE Transactions on Power Electronics, vol. 36, No. 10, pp. 11031-11035, Oct. 2021.

M. H. Ahmed, C. Fei, F. C. Lee and Q. Li, "48-V Voltage Regulator Module with PCB Winding Matrix Transformer forFuture Data Centers," in IEEE Transactions on Industrial Electronics, vol. 64, No. 12, pp. 9302-9310, Dec. 2017.

M. Mogorovicand D. Dujic, "100 KW, 10 KHz Medium-Frequency Transformer Design Optimization and ExperimentalVerification," inIEEE Transactions on Power Electronics, vol. 34, No. 2, pp. 1696-1708, Feb. 2019, doi: 10.1109/TPEL.2018.2835564.

M. Ngo, Y. Cao, D. Dong and R. Burgos, "Design of 500 kHz, 18 kW Low Leakage Inductance Intraleaved Litz WireTransformer for Bi-directional Resonant DC-DC Converter," 2021 IEEE Applied Power Electronics Conference andExposition (APEC), 2021, pp. 1153-1161.

M. Ngo, Y. Cao, K. Nguyen, D. Dong and R. Burgos, "Computational Fluid Dynamic Analysis and Design of an AirDuct Cooling System for 18 kW, 500 KHz Planar Transformers," 2021 IEEE Applied Power Electronics Conference andExposition (APEC), 2021, pp. 1496-1504.

Office Action in U.S. Appl. No. 17/819,353, mailed Oct. 13, 2023.

P. Czyz, T. Guillod, F. Krismer, J. Huber, and J. W. Kolar, "Design and Experimental Analysis of 166 kW Medium-Voltage Medium-Frequency Air-Core Transformer for 1:1-DCX Applications," IEEE Journal of Emerging and SelectedTopics in Power Electronics, pp. 1-1, 2021.

R. Raju, "Series resonant converters with the resonant capacitor replaced by a bridge," 2017 IEEE 12th InternationalConference on Power Electronics and Drive Systems (PEDS), 2017, pp. 999-1,002, doi: 10.1109/PEDS.2017.8289249.

T. Guillod, D. Rothmund, and J. W. Kolar, "Active Magnetizing Current Splitting ZVS Modulation of a 7 kV/400 V DCTransformer," IEEE Trans. Power Electron., vol. 35, No. 2, pp. 1293-1305, Feb. 2020, doi: 10.1109/TPEL.2019.2918622.

Thomas Guillod, "Active Magnetizing Current Splitting ZVS Modulation of a 7 kV/400 V DC Transformer", IEEE Transactions on Power Electronics, vol. 35, No. 2, Feb. 2020, pp. 1293-1305.

Tu, Hao, Hao Feng, SrdjanSrdic, and SrdjanLukic. "Extreme Fast Charging of Electric Vehicles: A TechnologyOverview." IEEE Transactions on Transportation Electrification 5,No. 4 (2019): 861-78.

W. Feng, P. Mattavelli, and F. C. Lee, "Pulsewidth Locked Loop (PWLL) for Automatic Resonant Frequency Tracking in LLC DC-DC Transformer (LLC-DCX)," IEEE Transactions on Power Electronics, vol. 28, No. 4, pp. 1862-1869, Apr. 2013.

X. Zhao, J. Hu, L. Ravi, D. Dong and R. Burgos, "Planar Common-Mode EMI Filter Design and optimization in a 100-kW SiC-based Generator-Rectifier System for High-Altitude Operation," 2021 IEEE Energy Conversion Congress andExposition (ECCE), 2021, pp. 3555-3562.

(56) References Cited

OTHER PUBLICATIONS

Y. Cao et al., "Design and Implementation of High-density Isolated Bi-directional Soft-switching Resonant DC-DCConverter with Partial Power Processing," 2021 IEEE Applied Power Electronics Conference and Exposition (APEC),2021, pp. 640-646.
Y. Cao et al., "Design and Implementation of an 18 kW 500 KHz 98.8% Efficiency High-density Battery Charger withPartial Power Processing," IEEE Journal of Emerging and Selected Topics in Power Electronics, pp. 1-1, 2021.
Y. Cao, M. Ngo, D. Dong and R. Burgos, "A Simplified Time-Domain Gain Model for CLLC Resonant Converter," 2021IEEE Energy Conversion Congress and Exposition (ECCE), 2021, pp. 3079-3086.
Y. Cao, M. Ngo, D. Dong and R. Burgos, "The ZVS Transition Analysis and Optimization for CLLC-Type Resonant DCTransformer," 2021 IEEE Energy Conversion Congress and Exposition (ECCE), 2021, pp. 3126-3133.
Y. Cao, M. Ngo, N. Yan, Y. Bai, R. Burgos and D. Dong, "DC Distribution Converter with Partial Power Processing forLVDC/ MVDC Systems," 2021 IEEE Fourth International Conference on DC Microgrids (ICDCM), 2021, pp. 1-8.
Y. Cao, M. Ngo, R. Burgos, A. Ismail and D. Dong, "Switching Transition Analysis and Optimization for Bi-directionalCLLC Resonant DC Transformer," in IEEE Transactions on Power Electronics, doi: 10.1109/TPEL.2021.3125265.
Y. Liu, C. Chen, K. Chen, Y. Syu and N. A. Dung, "High-Frequency and High-Efficiency Isolated Two-StageBidirectional DC-DC Converter for Residential Energy Storage Systems," in IEEE Journal of Emerging and SelectedTopics in Power Electronics, vol. 8, No. 3, pp. 1994-2006, Sep. 2020.
Yuliang Cao, "A Scalable Electronic-Embedded Transformer, a New Concept Toward Ultra-High-Frequency High-Power Transformer in DC-DC Converters", IEEE Transactions on Power Electronics, vol. 38, No. 8, Aug. 2023, pp. 9278-9293.
Yuliang Cao, "Switching Transition Analysis and Optimization for Bidirectional CLLC Resonant DC Transformer", IEEE Transactions on Power Electronics, vol. 37, No. 4, Apr. 2022 pp. 3786-3800.
Z. Hu, Y. Qiu, L. Wang and Y. Liu, "An Interleaved LLC Resonant Converter Operating at Constant SwitchingFrequency," in IEEE Transactions on Power Electronics, vol. 29, No. 6, pp. 2931-2943, Jun. 2014.
Z. Li, Y.-H. Hsieh, Q. Li, F. C. Lee and M. H. Ahmed, "High-Frequency Transformer Design with High-VoltageInsulation for Modular Power Conversion from Medium-Voltage AC to 400-V DC," 2020 IEEE Energy ConversionCongress and Exposition (ECCE), 2020, pp. 5053-5060.

* cited by examiner

TRAPEZOIDAL CURRENT CONTROL IN ELECTRONIC TRANSFORMERS

BACKGROUND

Many electronic devices and systems rely upon power at a well-regulated, constant, and well-defined voltage for proper operation. In that context, power conversion devices and systems are relied upon to convert electric power or energy from one form to another. A power converter is an electrical or electro-mechanical device or system for converting electric power or energy from one form to another. As examples, power converters can convert alternating current (AC) power into direct current (DC) power, convert DC power to AC power, provide a DC to DC conversion, provide an AC to AC conversion, change or vary the characteristics (e.g., the voltage rating, current rating, frequency, etc.) of power, or offer other forms of power conversion. A power converter can be as simple as a transformer, but many power converters have more complicated designs and are tailored for a variety of applications and operating specifications.

An isolated bidirectional DC transformer (DCX) is one example of a power converter. DCX converters play a significant role in applications such as electric vehicle (EV) chargers, high voltage data center power systems, energy storage systems, solid-state transformers, and other applications. DCX converters can interface two different DC buses or loads with high conversion efficiency. Series resonant converters (SRC), such as LLC or CLLC converters, are popular forms of DCX converters, due to the full load range zero voltage switching (ZVS) operation, low circulating current, and no requirement for voltage regulation offered by such converters.

SUMMARY

Power converters including electronic-embedded transformers for current sharing and load-independent voltage gain are described. An example power converter system includes an input, an output, a power converter between the input and output, and a controller. The converter includes a first bridge, a second bridge, and an electronic-embedded transformer (EET) between the first and second bridge. The EET includes a capacitor and a capacitance coupling switch bridge. The controller generates phasing drive control signals for trapezoidal current modulation control of the capacitance coupling switch bridge of the EET. The controller is configured to generate the phasing drive control signals based on a phase shift coefficient, k, to set a duty cycle of a voltage from the capacitance coupling switch bridge. The controller is also configured to vary k from between 0 to 0.5 based on a load applied to the power converter system or other operating aspects of the power converter.

In another example, an electronic-embedded transformer for a power converter includes a primary winding, a secondary winding, and a resonant inductor for use in the power converter, a capacitance coupling switch bridge, and a controller configured to generate phasing drive control signals for trapezoidal current modulation control of the capacitance coupling switch bridge. The resonant inductor is embodied as leakage inductance among the primary winding and the secondary winding. The controller is configured to generate the phasing drive control signals based on a phase shift coefficient, k, to set a duty cycle of a voltage from the capacitance coupling switch bridge. The controller is also configured to vary k from between 0 to 0.5 based on a load applied to the power converter system or other operating aspects of the power converter.

In another example, a power converter system includes a power converter and a controller. The power converter includes a first bridge of switching devices, a second bridge of switching devices, and an electronic-embedded transformer between the first bridge and the second bridge. The electronic-embedded transformer includes a capacitor and a capacitance coupling switch bridge. The controller is configured to generate switching control signals for the first bridge of switching devices and the second bridge of switching devices and to generate phasing drive control signals for the capacitance coupling switch bridge. The controller is configured to generate the phasing drive control signals based on a phase shift coefficient, k, to set a duty cycle of a voltage from the capacitance coupling switch bridge. The controller is also configured to vary k from between 0 to 0.5 based on a load applied to the power converter system or other operating aspects of the power converter.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1:
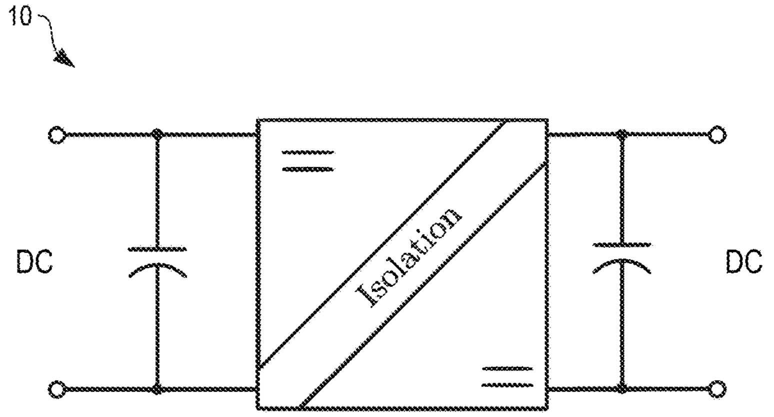
FIG. 1 illustrates an example isolated bidirectional resonant DC transformer (DCX) according to aspects of the embodiments.

As noted above, an isolated bidirectional DC transformer (DCX) is one example of a power converter. DCX converters can interface two different DC buses or loads with high conversion efficiency. DCX converters can provide galvanic (i.e., electrical) isolation between the input and output of the DCX. DCX converters also provide bidirectional power flow, load-independent constant voltage gain, and high efficiency with simple open loop control.

Two common circuit topologies for DCX converters include the dual active bridge (DAB) and the series resonant converter (SRC). SRC-based DCX converters can be more desirable because they have lower circulating currents and can operate with full zero voltage switching (ZVS). Particularly, SRC-based DCX converters, such as LLC or CLLC converters, are popular forms of DCX converters, due to the full load range ZVS operation, low circulating current, and open loop control with no requirement for voltage regulation.

A range of DCX converters are known, including unregulated, semi-regulated, and regulated converters. SRC-based DCX converters can be designed using a number of different topologies, such as full-bridge LLC converters with full-bridge rectifiers, half-bridge LLC converters with a half-bridge rectifiers, and others. Parallel resonant DCX converters and series-parallel DCX converters are also known.

For high power and increased power density, DCX converters can incorporate transformer paralleling and modularization techniques. However, paralleling transformers is challenging in SRC-based DCX converters, because even a small tolerance (i.e., difference) between the resonant tanks in the paralleled transformers can lead to current-sharing issues among the parallel transformers. Some approaches have been explored to address current sharing issues in parallelized SRC-based DCX converters. The approaches have various drawbacks, however, such as complicated transformer designs, limited operating parameters and applications, and topologies that are difficult to scale and modularize.

To address such current-sharing issues and provide a better solution for DCX converters capable of higher power operation and power density, the DCX converter embodiments described herein include electronic-embedded transformers (EETs). The EETs include electronically-controlled or electronically-coupled resonant capacitors in a bridge configuration. The EETs provide current sharing among paralleled transformers and load-independent voltage gain operation. Examples of DCX converters including EETs are described in U.S. patent application Ser. No. 17/819,353, titled "ELECTRONIC TRANSFORMER FOR CURRENT SHARING AND LOAD-INDEPENDENT VOLTAGE GAIN," filed Aug. 12, 2022 ("the '353 Application"), the entire contents of which is hereby incorporated herein by reference.

By incorporating an integrated low voltage full bridge, EETs offer a straightforward means of achieving high-frequency, high-power, fixed-gain isolated DC-DC conversion in DCX converters, through parallel operation of EET units with natural current sharing. However, when EET-based DCX converters are operated with triangular transformer currents, they exhibit a higher root mean square (rms) value as compared to the sinusoidal currents in LLC or CLLC-based DCX converters. The embodiments described herein address this limitation through the use of a trapezoidal current modulation technique for EET-based DCX converters.

Through the implementation of trapezoidal current modulation, EET-based DCX converters can effectively reduce rms currents as compared to when triangular current modulation is used. The use of trapezoidal current modulation can reduce rms currents as compared to sinusoidal current modulation used in CLLC-based DCX converters. The trapezoidal current modulation techniques described herein also contribute to a noteworthy reduction of total conduction loss, encompassing both device and transformer winding losses. Notably, the proposed trapezoidal current modulation techniques retain the advantages of the previous EET-based DCX converter designs, including natural current sharing, optimal operation at any frequency, load-independent voltage gain, simple open-loop control, and full load range ZVS.

According to aspects of the embodiments, power converters including electronic-embedded transformers for current sharing and load-independent voltage gain are described. An example power converter system includes an input, an output, a power converter between the input and output, and a controller. The converter includes a first bridge, a second bridge, and an electronic-embedded transformer (EET) between the first and second bridge. The EET includes a capacitor and a capacitance coupling switch bridge. The controller generates phasing drive control signals for trapezoidal current modulation control of the capacitance coupling switch bridge of the EET. The controller is configured to generate the phasing drive control signals based on a phase shift coefficient, k, to set a duty cycle of a voltage from the capacitance coupling switch bridge. The controller is also configured to vary k from between 0 to 0.5 based on a load applied to the power converter system or other operating aspects of the power converter. Turning to the drawings, FIG. 1 illustrates an example isolated bidirectional resonant DCX converter 10 ("DCX 10") according to aspects of the embodiments. The DCX 10 is electrically coupled between a first or input DC bus and a second or output DC bus as shown. The DCX 10 can provide galvanic isolation and bidirectional power flow between the input and the output with high efficiency and simple open loop control. The DCX 10 is an SRC-based DCX converter, as described in further detail below, although the concepts described herein are not limited to use with only SRC-based DCX converters. The concepts can be applied to other types of DCX converters in some cases and to other types of converters.

Figure 2:
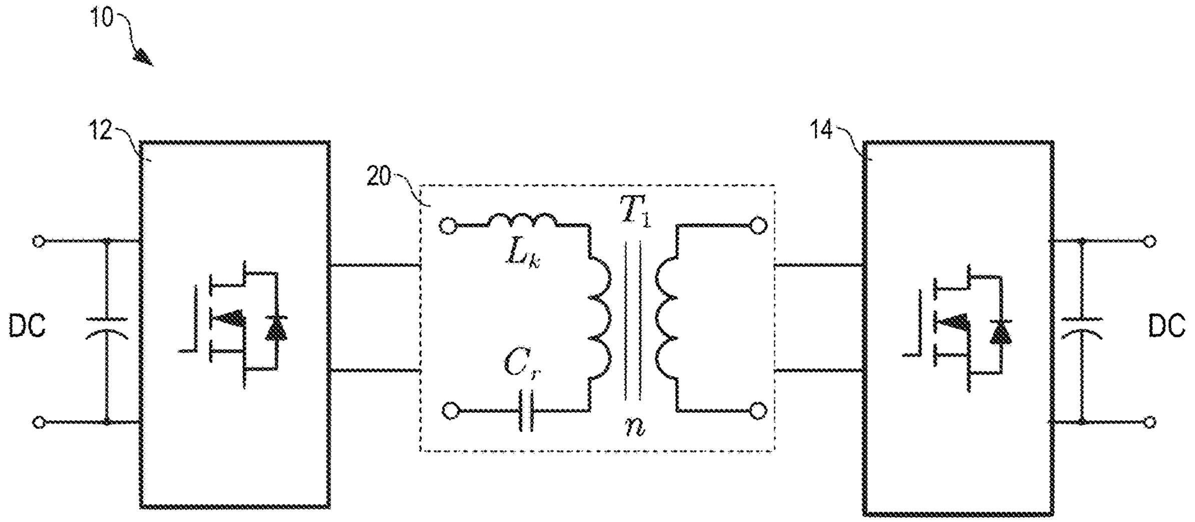
FIG. 2 illustrates another example of the DCX shown in FIG. 1 according to aspects of the embodiments.

FIG. 2 illustrates another example of the DCX 10 shown in FIG. 1. The DCX 10 includes a first or input switching bridge 12, a second or output switching bridge 14, and a transformer 20 coupled between the bridges 12 and 14. The input switching bridge 12 can include a first bridge of switching devices, such as full bridge arrangement of switching transistors, and the output switching bridge 14 can include a second bridge of switching devices, such as another full bridge arrangement of switching transistors. As described in further detail below, the transistors in the bridges 12 and 14 can be driven with complimentary control signals, to direct the power flow between the two sides of the DCX 10, in either direction. Power flow in the DCX 10 can be directed by phase-shifting the drive control signals of the bridges 12 and 14 with respect to each other using phase shift modulation, for example.

The transformer 20 includes primary and secondary windings, as would be understood in the field, for galvanic isolation between the two sides of the DCX 10. The transformer 20 also includes a resonant tank, which is provided by a capacitor C, and an inductor $L_k$, which is relied upon for (and permits) the SRC-based operation of the DCX 10. The inductor $L_k$ can be embodied by the leakage inductance of the transformer 20 in some cases. As described with reference to FIG. 8 in the '353 Application, the transformer 20 can be parallelized in the DCX 10 to achieve higher power operation and increased power density. However, paralleling transformers in the DCX 10 can be challenging, because even a small tolerance or difference between the resonant tanks among the transformers will lead to current-sharing issues among the paralleled transformers. Thus, the transformer 20 can be implemented as an EET to provide certain benefits, particularly when the DCX 10 includes paralleled transformers. Coupling of the resonant capacitor $C_r$ is then electronically-controlled using a bridge configuration.

Figure 3:
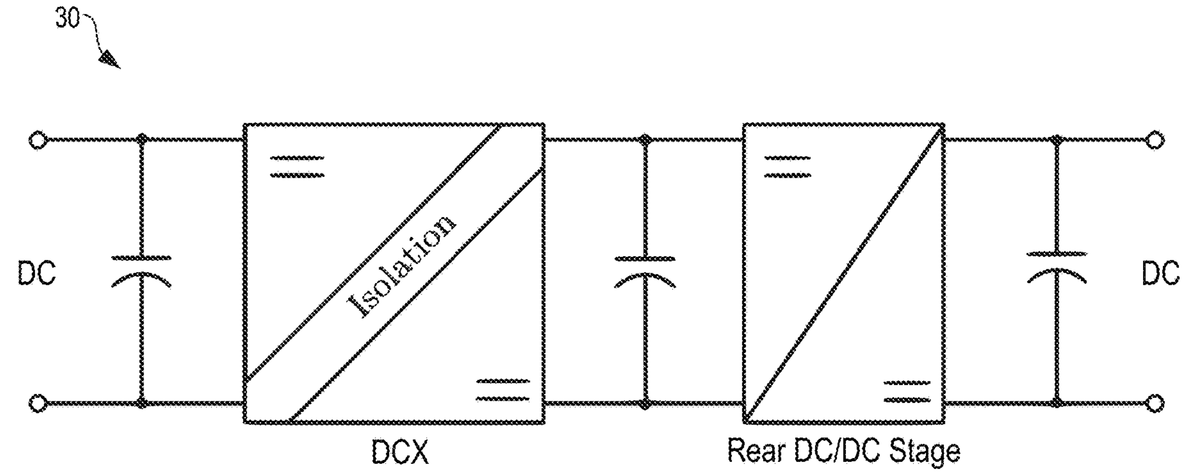
FIG. 3 illustrates an example of a DCX with voltage regulation according to aspects of the embodiments.
Figure 4:
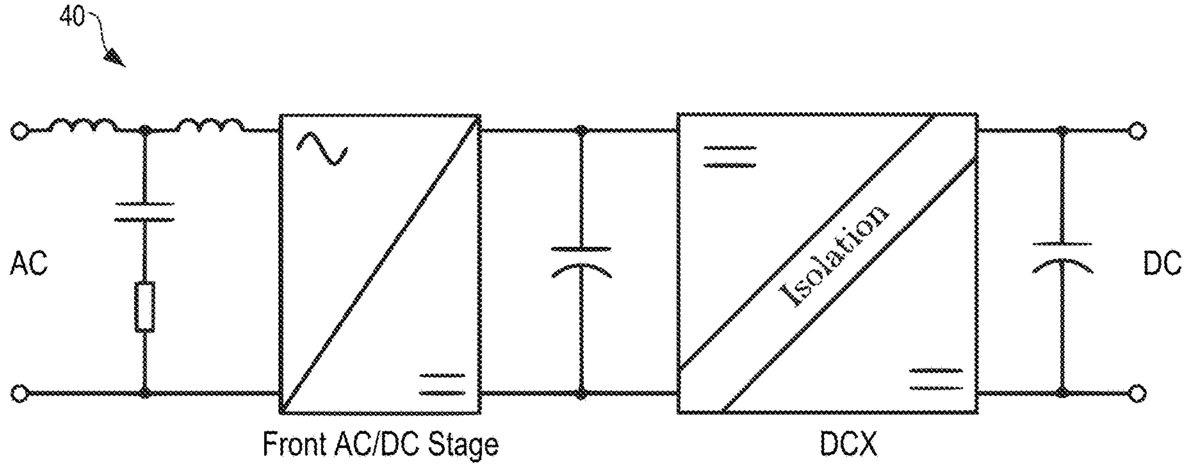
FIG. 4 illustrates another example of a DCX with voltage regulation according to aspects of the embodiments.
Figure 5:
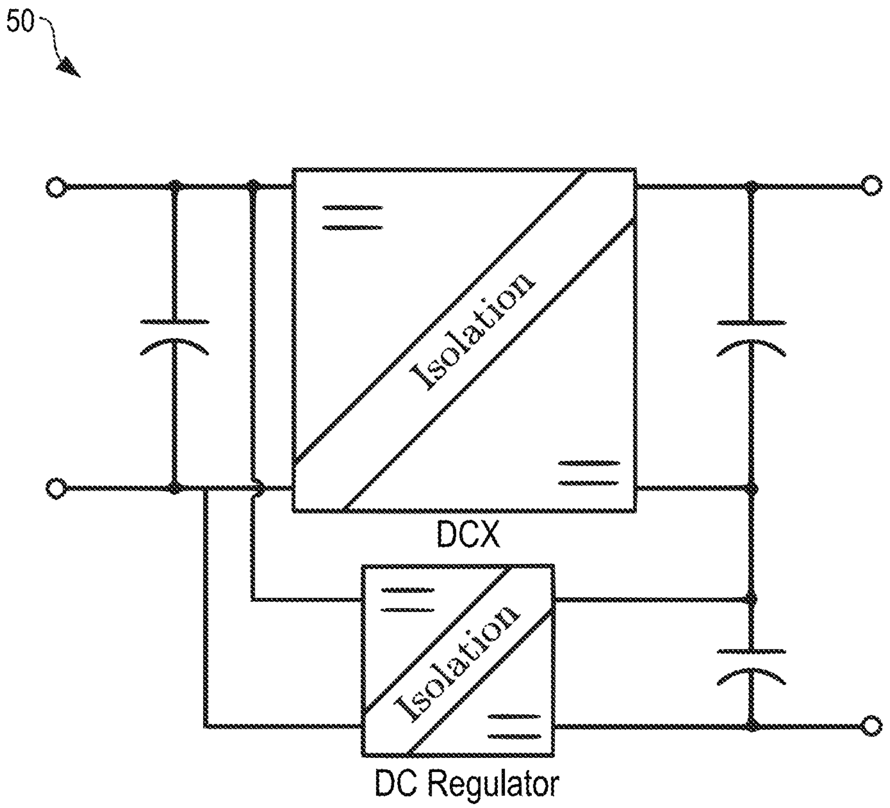
FIG. 5 illustrates another example of a DCX with voltage regulation according to aspects of the embodiments.

Other power converter configurations including DCX converters can include additional stages. As examples, FIGS. 3-5 illustrate DCX converters with additional stages for voltage regulation. FIG. 3 illustrates a converter 30 with a front-end DCX stage and a rear-end regulated DC/DC converter stage. The rear-end DC/DC converter stage can provide a regulated output voltage, for example, or other regulation in the power conversion of the converter 30. FIG. 4 illustrates a converter 40 with a front-end AC/DC converter stage and a rear-end DCX converter stage. The front-end AC/DC converter stage can provide AC/DC conversion, a regulated voltage for the DCX converter stage, or other conversion or regulation in the converter 40. FIG. 5 illustrates a converter 50 in a quasi-parallel configuration.

The converter 50 connects a DCX converter and a DC regulator converter in series. A benefit of the converter 50 is the ability to achieve higher conversion efficiency by sharing or distributing the input power between the DCX converter and the DC regulator converter.

Figure 6:
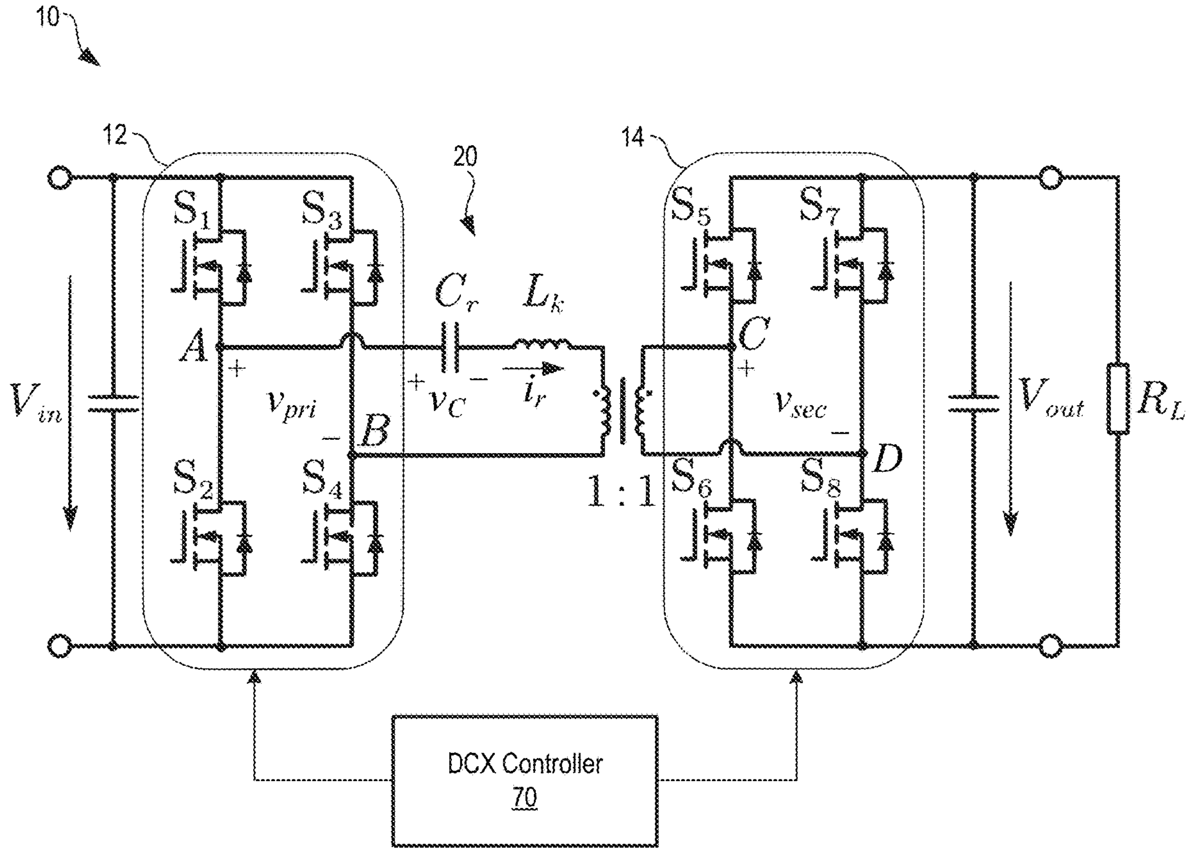
FIG. 6 illustrates a more detailed schematic diagram of the DCX shown in FIG. 2 according to aspects of the embodiments.

FIG. 6 illustrates a more detailed schematic diagram of the DCX 10 shown in FIG. 2 according to aspects of the embodiments. As shown, the first or input switching bridge 12 includes switching devices $S_1$-$S_4$ arranged in a full bridge, and the second or output switching bridge 14 includes switching devices $S_5$-$S_8$ arranged in a full bridge. The DCX 10 also includes a DCX controller 70. The switching devices $S_1$-$S_4$ and $S_5$-$S_8$ can be embodied as switching transistors, such as insulated-gate bipolar transistors or other suitable transistors.

The DCX controller 70 can be embodied as processing circuitry, including memory, configured to control the operation of the DCX 10, with or without feedback. The DCX controller 70 can be embodied as any suitable type of controller, such as a proportional integral derivative (PID) controller, a proportional integral (PI) controller, or a multi-pole multi-zero controller, among others, to control the operations of the DCX 10. The DCX controller 70 can be realized using a combination of processing circuitry and referenced as a single controller. It should be appreciated, however, that the DCX controller 70 can be realized using a number of controllers, control circuits, drivers, and related circuitry, operating with or without feedback.

In some cases, the DCX controller 70 can receive a metric or measure of one or more of the input voltage $V_{in}$, the input current, the output voltage $V_o$, the output current or power provided to the load $R_L$, the resonant converter operating frequency $f_S$, or other operating metrics of the DCX 10 as inputs, along with external control inputs. The DCX controller 70 is configured to generate switching control signals for the switching devices $S_1$-$S_4$ and $S_5$-$S_8$ at a switching frequency $f_s$. The switching control signals direct the operation of the switching devices $S_1$-$S_4$ and $S_5$-$S_8$ to transfer power between the input and the output of the DCX 10. In one example, the switching devices $S_1$, $S_4$, $S_5$, and $S_8$ can share a first control signal provided by the DCX controller 70, and the switching devices $S_2$, $S_3$, $S_6$, and $S_7$ can share a second control signal provided by the DCX controller 70, where the first and second control signals have complimentary "on" and "off" timings. The DCX controller 70 can generate the switching control signals based, at least in part, on the feedback metrics of the DCX 10, although the DCX 10 can also operate with open loop control in some cases. The duty cycle of the switching control signals can be varied by the DCX controller 70 to direct the transfer of power by the DCX 10.

Due to the presence of the resonant capacitor Cr and inductor Lk in the DCX 10, the currents $i_{pri}$ and $i_{sec}$ through the primary and secondary sides of the transformer 20 are both sinusoidal waveforms. The resonant frequency $f_r$ of DCX 10 can be derived as:

$$f_r = \frac{1}{2\pi\sqrt{C_r L_k}}. \tag{1}$$

Figure 7:
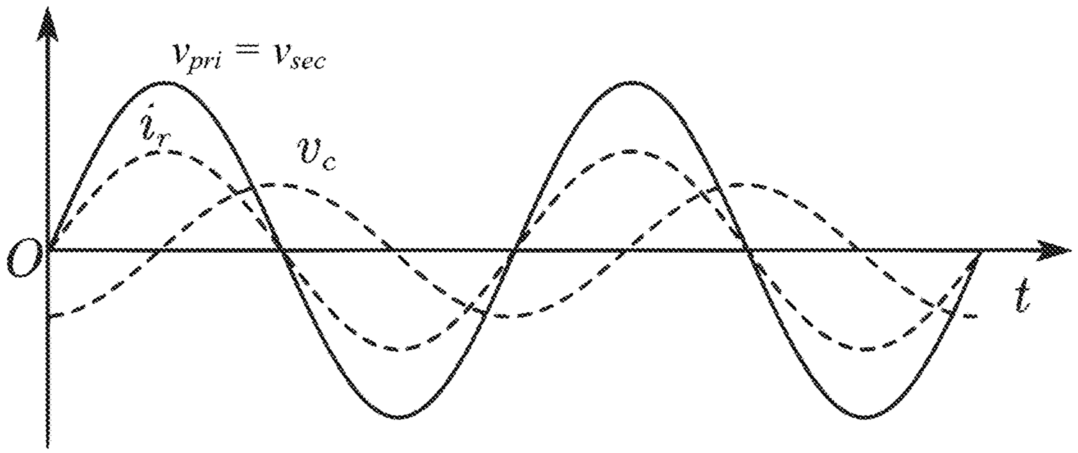
FIG. 7 illustrates an example of certain voltages and currents in the DCX shown in FIG. 2 during resonant operation according to aspects of the embodiments.

When the DCX 10 is operating at the resonant frequency $f_r$, the primary and secondary side voltages $V_{pri}$ and $v_{sec}$ and the current $i_r$ through the resonant tank of the transformer 20 are in phase, as shown in FIG. 7. When DCX 10 operates at a switching frequency $f_s$ that is equal to the resonant frequency $f_r$, the impedances produced by $C_r$ and $L_k$ will cancel each other, and the equivalent impedance on the loop will be very small and close to 0. Additionally, the sinusoidal voltage $v_C$ across $C_r$ has a 90° phase shift delay with respect to the primary and secondary side voltages $v_{pri}$ and $v_{sec}$, as also shown in FIG. 7. In this situation, power can be transferred by the DCX 10 at high efficiency, with load-independent voltage gain, and ZVS operation.

However, even a relatively small change in the values of $C_r$ and $L_k$ will shift the resonant frequency $f_r$ of the DCX 10. Without a corresponding change in the switching frequency $f_s$, the impedance on the power transfer loop in the transformer 20 will increase relatively dramatically and the DCX 10 cannot operate with optimal power transfer. This mismatch will result in load-dependent voltage transfer gain, as opposed to load-independent voltage gain, and efficiency deterioration for the DCX 10.

Figure 8:
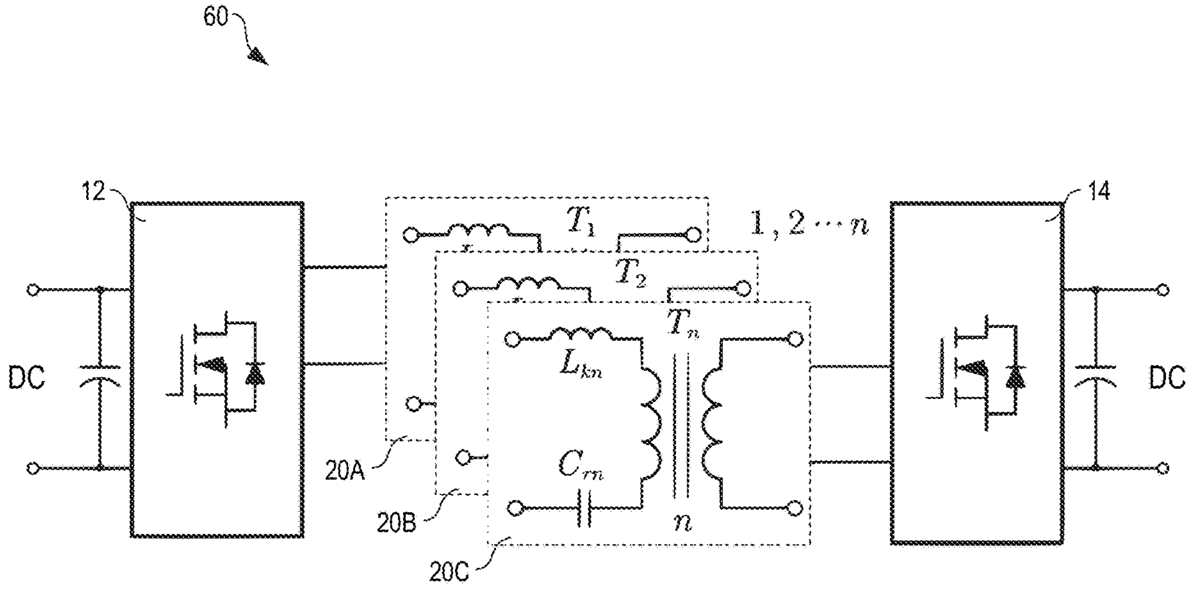
FIG. 8 illustrates an example of a DCX with parallel transformers according to aspects of the embodiments.

FIG. 8 illustrates an example of a DCX 60 with parallel transformers 20A-20C according to aspects of the embodiments. The DCX 60 is similar to the DCX 10 shown in FIGS. 1, 2, and 6, but the DCX 60 includes a parallel arrangement of n transformers 20A-20C between the input switching bridge 12 and the output switching bridge 14. The parallel arrangement of the transformers 20A-20C can be relied upon to increase the power handling capacity and density of the DCX 60 as compared to the DCX 10.

Paralleling the transformers 20A-20C is challenging in SRC-based DCX converters, however. Even when the transformers 20A-20C are each manufactured according to the same design, small differences in the resonant tanks among the transformers 20A-20C will lead to current-sharing disparities among the parallel transformers 20A-20C. The differences in the resonant tanks can be attributed to variations among the $L_k$ inductances, C, capacitances, and other parasitic, mechanical, and electrical differences among the transformers 20A-20C due to manufacturing tolerances. Additionally, the $L_k$ inductances, $C_r$ capacitances, and other electrical characteristics of the resonant tanks can vary based on differences in the operating temperatures among the transformers 20A-20C and other factors. The differences in the resonant tanks also makes it particularly difficult to operate the DCX 60 at a switching frequency $f_s$ that matches to a combined resonant frequency $f_r$ of the parallel transformers 20A-20C.

To address the current-sharing issues in the DCX 60 and provide a better solution for DCX converters capable of higher power handling capacity and power density, the DCX converter embodiments described herein include EETs having resonant capacitors that are electronically-controlled or electronically-coupled in a bridge configuration.

Figure 9:
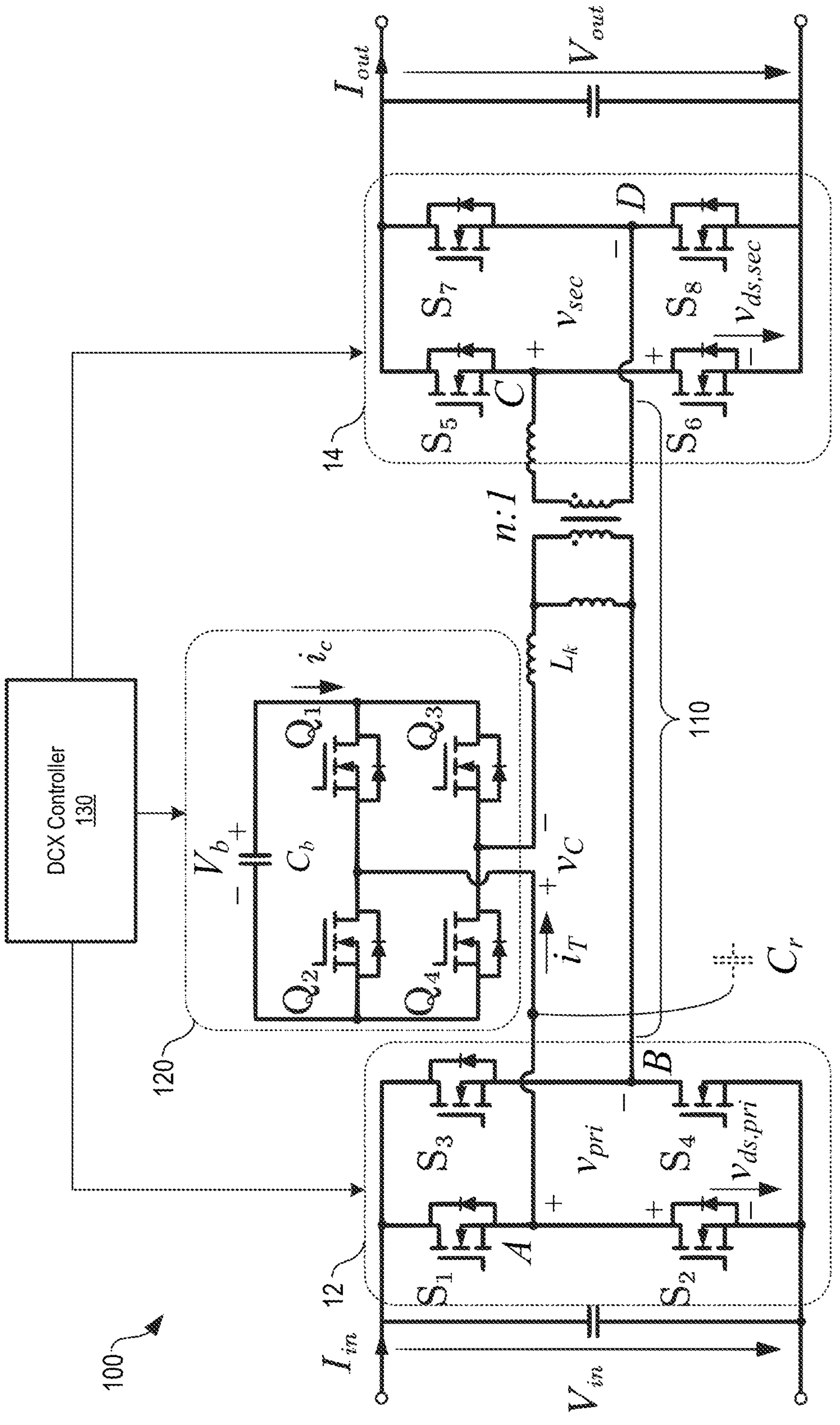
FIG. 9 illustrates an example of a DCX with an electronic-embedded transformer (EET) according to aspects of the embodiments.

FIG. 9 illustrates an example of a DCX 100 with an EET 110 according to aspects of the embodiments. The DCX 100 includes the first or input switching bridge 12, the second or output switching bridge 14, the EET 110, and a DCX controller 130. The DCX 100 is illustrated as a representative example. The DCX 100 can vary as compared to that shown. For example, the DCX 100 can include other components that are not illustrated in FIG. 9, and the DCX 100 can omit one or more of the components that are illustrated in FIG. 9. The switching devices, transformers, controllers, and other components in the DCX 100 can be embodied as described below or using other suitable devices (e.g., other types of transistors, transformers, controllers, etc.), as the DCX 100 is not limited to being implemented with any particular type or style of electronic components.

As shown, the first or input switching bridge 12 includes switching devices $S_1$-$S_4$, and the second or output switching bridge 14 includes switching devices $S_5$-$S_8$. The EET 110 includes a primary winding, a secondary winding, a resonant inductor $L_k$, and a capacitance coupling switch bridge 120 (also "coupling switch bridge 120") in series with the resonant inductor $L_k$. The EET 110 is similar to the transformer 20 of the DCX 10 but also includes the coupling switch bridge 120. The EET 110 is shown as an n:1 transformer. The coupling switch bridge 120 includes a number of switching devices for coupling a capacitor $C_b$ in series with the resonant inductor $L_k$. Because the coupling switch bridge 120 includes active devices, the EET 110 can be referenced as an electronic-embedded transformer 110 ("EET 110").

Because the EET 110 replaces the transformer 20 of the DCX 10 shown in FIG. 6, the resonant capacitor $C_r$ of the transformer 20 is not shown in FIG. 9. Instead, the capacitor $C_b$ in the coupling switch bridge 120 provides a type of substitute for the resonant capacitor $C_r$. However, in some cases, the inductance of the resonant inductor $L_k$ can be relatively large (e.g., in some wireless charging applications, etc.). Thus, in some embodiments, the DCX 100 can also include an additional resonant capacitor $C_r$ coupled in series between the node or point "A" and the coupling switch bridge 120, as shown in FIG. 9. For large values of $L_k$, the additional $C_r$ can cancel part of the inductance of the resonant inductor $L_k$, and the capacitor $C_b$ can cancel the remaining inductance of the resonant inductor $L_k$.

FIG. 9 also identifies $V_{in}$ and $V_{out}$, which denote the input and output voltages for the DCX 100, respectively, and $I_{in}$ and $I_{out}$, which denote the input and output currents for the DCX 100, respectively. Additionally, $v_{pri}$ corresponds to the voltage across the A and B nodes in the input switching bridge 12, and $v_{sec}$ corresponds to the voltage across the C and D nodes in the output switching bridge 14. The voltage across $C_b$ is denoted as $V_b$, and its amplitude during operation of the DCX 100 is discussed below. The voltage $v_C$ denotes output voltage across the coupling switch bridge 120 with an amplitude equivalent to $V_b$. $L_k$ represents and can be embodied as the leakage inductance of the transformer in the EET 110, and $i_T$ represents the current flowing through the EET 110. The magnetizing inductance in the EET 110 is disregarded as it exclusively pertains to the ZVS of the switching bridges 12 and 14 and is unrelated to the ZVS of the coupling switch bridge 120 in the EET 110.

Figure 23A:
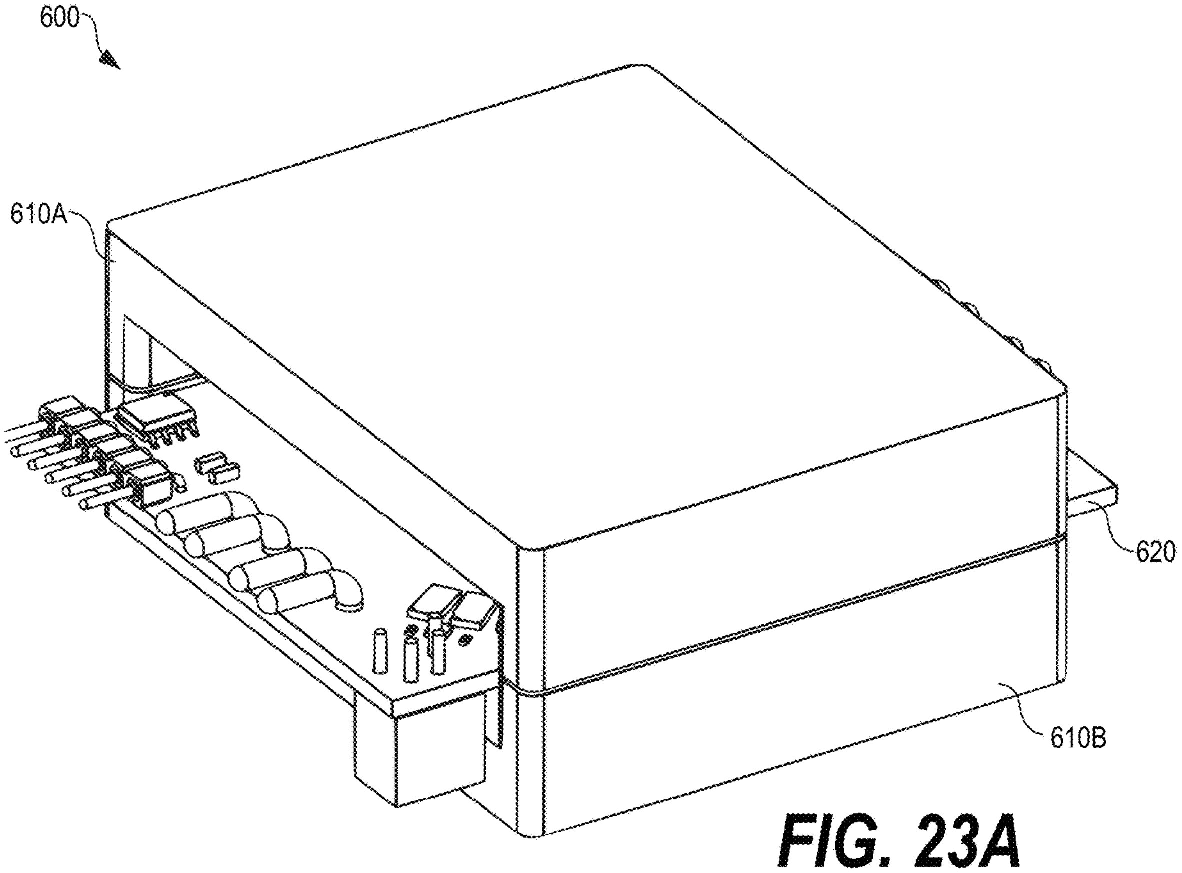
FIG. 23A illustrates an example of an EET module according to aspects of the embodiments.
Figure 23B:
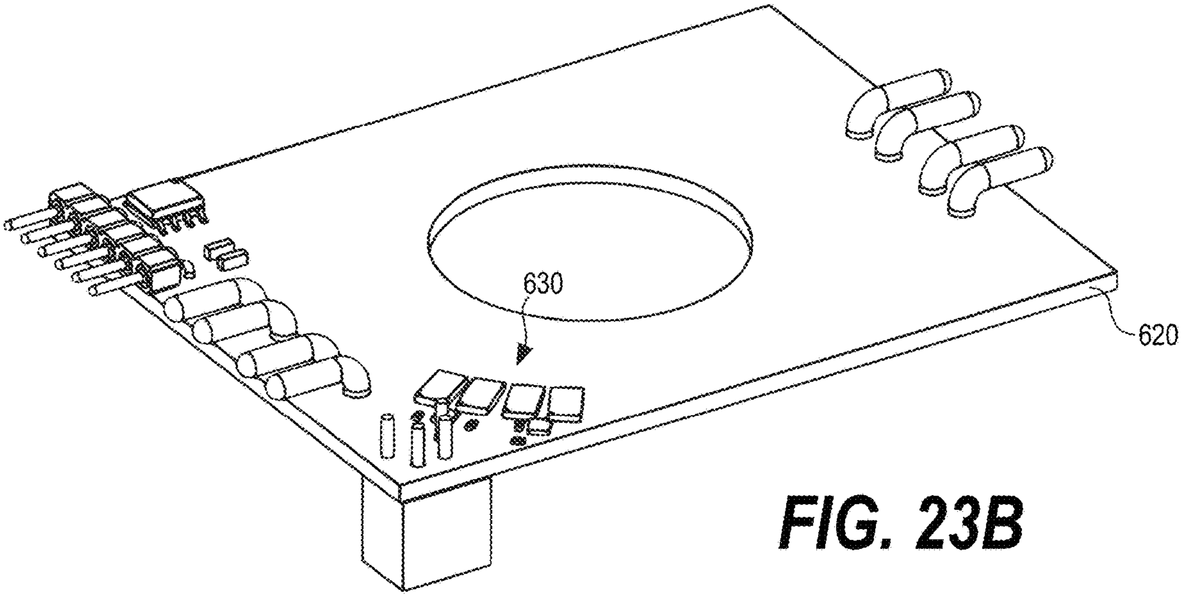
FIG. 23B illustrates an example of the EET module shown in FIG. 15A, with the core omitted from view, according to aspects of the embodiments.

The coupling switch bridge 120 includes the capacitor $C_b$ and coupling or switching devices $Q_1$-$Q_4$. The switching devices $Q_1$-$Q_4$ are arranged in a full bridge and can be referenced as a capacitance coupling switch bridge, for coupling the capacitor $C_b$ in series with the resonant inductor $L_k$. The switching devices $Q_1$-$Q_4$ can be embodied as switching transistors. Because the voltages present across the switching devices $Q_1$-$Q_4$ are lower than the voltages present across the switching devices $S_1$-$S_8$, the switching devices $Q_1$-$Q_4$ can be much smaller and integrated as part of the design of the EET 110 as a module. Examples of the implementation of the EET 110 as a module are illustrated in FIGS. 23A and 23B. With the full bridge arrangement of the switching devices $Q_1$-$Q_4$, the coupling switch bridge 120 is capable of connecting the capacitor $C_b$ in series with the resonant inductor $L_k$ based on drive control signals provided to the gates of the switching devices $Q_1$-$Q_4$.

The DCX controller 130 can be embodied as processing circuitry, including memory, configured to control the operation of the DCX 100, with or without feedback. The DCX controller 130 can be embodied as any suitable type of controller, such as a PID controller, a PI controller, or a multi-pole multi-zero controller, among others, to control the operations of the DCX 100. The DCX controller 130 can be realized using a combination of processing circuitry and referenced as a single controller. It should be appreciated, however, that the DCX controller 130 can be realized using a number of controllers, control circuits, drivers, and related circuitry.

In some cases, the DCX controller 130 can receive a metric or measure of one or more of the input voltage $V_{in}$, the input current $I_{in}$, the output voltage $V_o$, output current $I_{out}$ or power provided to a load $R_L$ (not shown in FIG. 9), the voltage $v_C$ across the output of the coupling switch bridge 120, the operating frequency $f_S$, or other operating metrics of the DCX 100 as inputs, along with external control inputs.

The DCX controller 130 is configured to generate drive or switching control signals for the switching devices $S_1$-$S_4$ and $S_5$-$S_8$ at a switching frequency $f_s$. The switching control signals direct the operation of the switching devices $S_1$-$S_4$ and $S_5$-$S_8$ to transfer power between the input and the output of the DCX 100. The DCX controller 130 is also configured to generate phasing drive control signals for the switching devices $Q_1$-$Q_4$ in the coupling switch bridge 120, as described below. The resonant phasing drive control signals for the switching devices $Q_1$-$Q_4$ can also be generated at the switching frequency $f_s$, but they are phase offset as described below.

In one example, the switching devices $S_1$, $S_4$, $S_5$, and $S_8$ in the bridges 12 and 14 can share a first control signal provided by the DCX controller 130, and the switching devices $S_2$, $S_3$, $S_6$, and $S_7$ in the bridges 12 and 14 can share a second control signal provided by the DCX controller 130, where the first and second control signals have complimentary “on” and “off” timings. The DCX controller 130 can generate the switching control signals based, at least in part, on the feedback metrics of the DCX 100, although the DCX 100 can also operate with simple open loop control. The duty cycle of the switching control signals can be varied by the DCX controller 130 in some cases to direct the amount of power transferred by the DCX 10.

The DCX controller 130 can also generate phasing drive control signals for the switching devices $Q_1$-$Q_4$ in the coupling switch bridge 120. In the examples described in the ’353 Application, the switching devices $Q_2$ and $Q_3$ in the coupling switch bridge 120 share a first phasing drive control signal provided by the DCX controller 130, and the switching devices $Q_1$ and $Q_4$ share a second phasing drive control signal provided by the DCX controller 130, where the first and second phasing drive control signals have complimentary “on” and “off” timings. In that implementation, the EET 110 is operated with triangular transformer currents with a higher rms value as compared to the sinusoidal currents in LLC or CLLC-based DCX converters.

In the embodiments described herein, the DCX controller 130 is configured to generate phasing drive control signals for the switching devices $Q_1$-$Q_4$ for trapezoidal current modulation in the EET 110. Through the implementation of trapezoidal current modulation according to the embodiments, EET-based DCX converters can effectively reduce rms currents as compared to when triangular current modulation is used. The use of trapezoidal current modulation can reduce rms currents as compared to sinusoidal current modulation used in CLLC-based DCX converters. The trapezoidal current modulation techniques described herein contribute to a noteworthy reduction of total conduction loss, including reduced switching losses in the switching devices $Q_1$-$Q_4$ of the EET 110 and reduced switching losses in the switching devices $S_1$-$S_4$ and $S_5$-$S_8$ of the input and output switching bridges 12 and 14. Compared to triangular current modulation control, conduction loss can be reduced by between 10-25%, for example, when using the trapezoidal current modulation techniques described herein. The proposed trapezoidal current modulation techniques also retain the advantages of natural current sharing, optimal operation at any frequency, load-independent voltage gain, simple open-loop control, and full load range ZVS, as in the EET-based DCX converters described in the ’353 Application.

Figure 10:
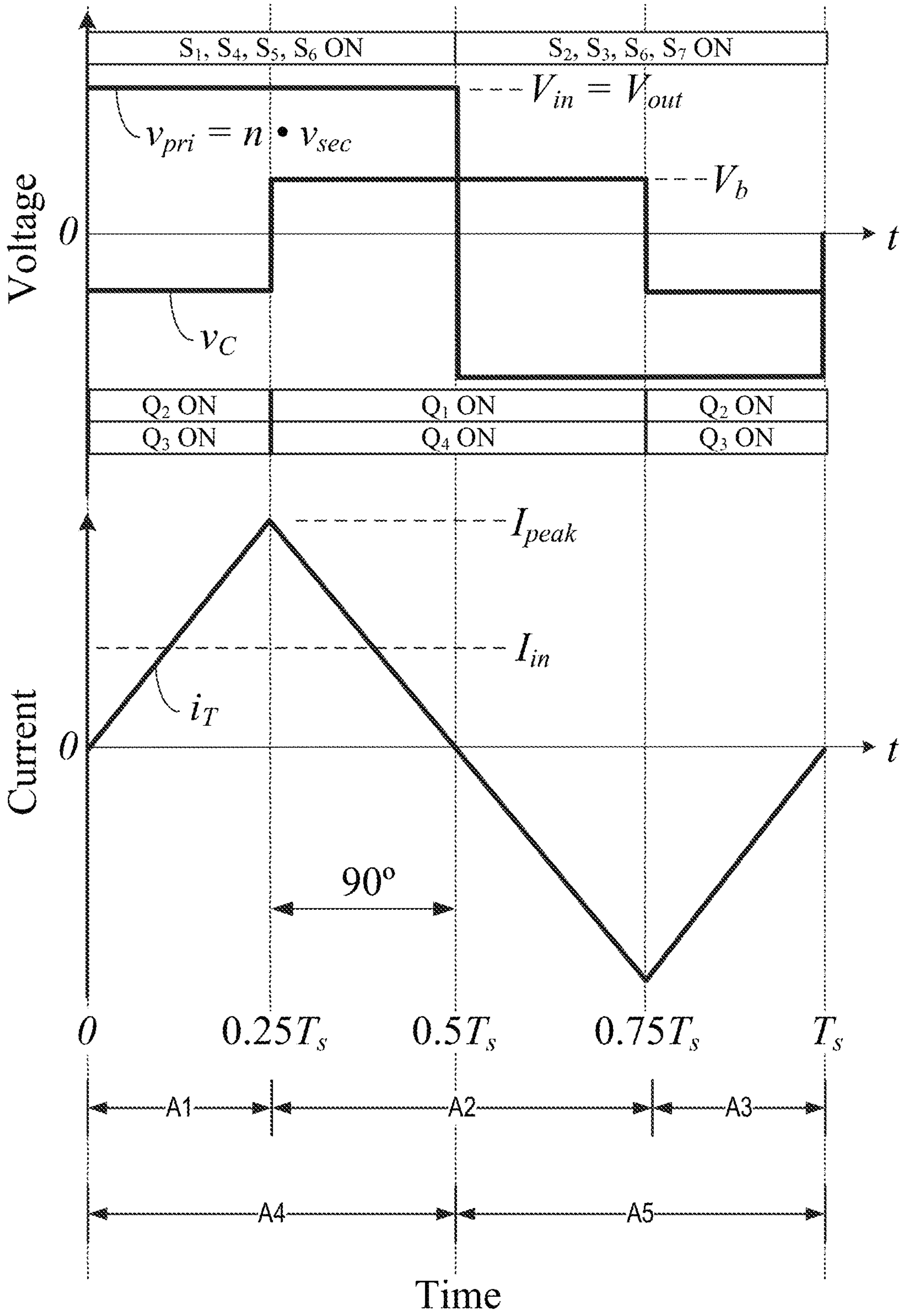
FIG. 10 illustrates example control timings for triangular current modulation control in the DCX shown in FIG. 9 according to aspects of the embodiments.

FIG. 10 illustrates example control timings for triangular current modulation control in the DCX 100 shown in FIG. 9. The waveforms in FIG. 10 are shown over a period of time $T_s$, related to the switching frequency $f_s$. In FIG. 10, $v_{pri}$ is the voltage across the nodes A and B in the switching bridge 12 shown in FIG. 9, which is the same as the $v_{sec}$ voltage across the nodes C and D in the switching bridge 14, assuming a primary and secondary winding turns ratio of 1:1 in the EET 110. The $v_C$ is the voltage across an output of the coupling switch bridge 120. The current $i_T$ through the coupling switch bridge 120 of the EET 110 is also shown in FIG. 10.

For the time period A4, the DCX controller 130 can generate switching control signals to turn on the switching devices $S_1$, $S_5$, $S_5$, and $S_8$ and to turn off the switching devices $S_2$, $S_4$, $S_5$, and $S_8$, resulting in a positive voltage across the nodes A and B in the bridge 12 (and C and D in the bridge 14). For the time period A5, the DCX controller 130 generates switching control signals to turn on the switching devices $S_2$, $S_4$, $S_5$, and $S_8$ and to turn off the switching devices $S_1$, $S_4$, $S_5$, and $S_8$, resulting in a negative or reverse voltage across the nodes A and B in the bridge 12 (and C and D in the bridge 14).

The DCX controller 130 also generates phasing drive control signals for the switching devices $Q_1$-$Q_4$ in the coupling switch bridge 120. For triangular current modulation control, as shown in FIG. 10, the phasing drive control signals for the switching devices $Q_1$-$Q_4$ are phase shifted by 90° as compared to the control signals for the switching devices $S_1$-$S_8$ in the bridges 12 and 14 over the period of time $T_s$. Particularly, for the time period A1, the DCX controller 130 generates phasing drive control signals to turn on the switching devices $Q_2$ and $Q_3$ and to turn off the switching devices $Q_1$ and $Q_4$. For the time period A2, the DCX controller 130 generates phasing drive control signals to turn on the switching devices $Q_1$ and $Q_4$ and to turn off the switching devices $Q_2$ and $Q_3$. For the time period A3, the DCX controller 130 generates phasing drive control signals to turn on the switching devices $Q_2$ and $Q_3$ and to turn off the switching devices $Q_1$ and $Q_4$.

Thus, the phasing drive control signals for the switching devices $Q_{1-4}$ in the series coupling bridge 120 have a 90° phase shift delay with respect to the drive control signals provided to the switching devices $S_{1-4}$ and $S_{5-8}$ in the bridges 12 and 14. With this 90° phase delay, the coupling switch bridge 120 can cancel the impedance produced by the leakage inductance $L_k$ by the switched coupling of the $v_C$ voltage (i.e., the voltage across the output of the coupling switch bridge 120) in series with the leakage inductance $L_k$, at any switching frequency $f_s$. The operation principle of the DCX 100 is similar to the DCX 10 at resonant frequency. However, unlike the DCX 10, which has sinusoidal currents in the transformer 20 (see FIG. 7), the DCX 100 has triangular currents in the EET 110 because the ve voltage has a square (rather than sinusoidal) waveform, as shown in FIG. 10. With the 90° phase shift between the control of the coupling switch bridge 120 and the bridges 12 and 14, the current through the primary side of the EET 110 in the DCX 100 is always in phase with the voltage across the primary side of the EET 110. Additionally, the current through the secondary side of the EET 110 is always in phase with the voltage across the secondary side of the EET 110. Thus, only real power will be transferred from the input to the output of the DCX 100 and high efficiency can be obtained.

In the steady state, the relationship between $V_{in}$ and $V_{out}$, $I_{in}$ and $I_{out}$, as well as $v_{pri}$ and $v_{sec}$ can be directly determined as follows:

$$V_{in} = n \cdot V_{out},\ I_{in} = I_{out}/n,\ v_{pri} = n \cdot v_{sec}. \quad (2)$$

Based on Eq. (2), it can be observed that when $v_{pri}$ equals $v_{sec}$, only the voltage source $v_C$ will be utilized to drive $L_k$, resulting in the generation of a triangular current waveform as shown in FIG. 10. Consequently, the floating capacitor voltage $V_b$ can be determined as follows:

$$V_b = 8 f_s L_k I_{in}. \quad (3)$$

As shown in FIG. 10, the $v_C$ waveform in triangular modulation control is represented by a 50% duty cycle square waveform with an amplitude of $V_b$, as derived in Eq. (3). The corresponding gating signals for the switching devices $Q_1$-$Q_4$ in the coupling switch bridge 120 are also shown in FIG. 10 and described above.

However, a remaining issue with the operation of the DCX 100 with triangular current modulation control of the EET 110 by the DCX controller 130 pertains to the triangular waveform of the transformer current $i_T$. In comparison to the sinusoidal current employed in typical CLLC-DCX, the triangular current $i_T$ depicted in FIG. 10 exhibits a larger rms value. Consequently, this can lead to higher conduction losses in both the devices and transformer windings in the EET 110. Notably, the device losses encompass losses in both the switching devices $S_1$-$S_8$ and in the switching devices $Q_1$-$Q_4$ within the EET 110.

To mitigate the rms current in the DCX 100, the embodiments described herein incorporate trapezoidal current modulation control. By employing this form of control, the trapezoidal current exhibits smaller rms and peak values under the same power transfer conditions. As a result, trapezoidal current modulation control not only reduces total conduction losses but also diminishes switching losses on the integrated low voltage bridge in the EET 110 due to the lower peak current. Importantly, all the advantages associated with the DCX 100, such as natural current sharing, load-independent voltage gain, and the absence of resonant point tuning requirements, are retained in when using trapezoidal current modulation control.

Figure 11:
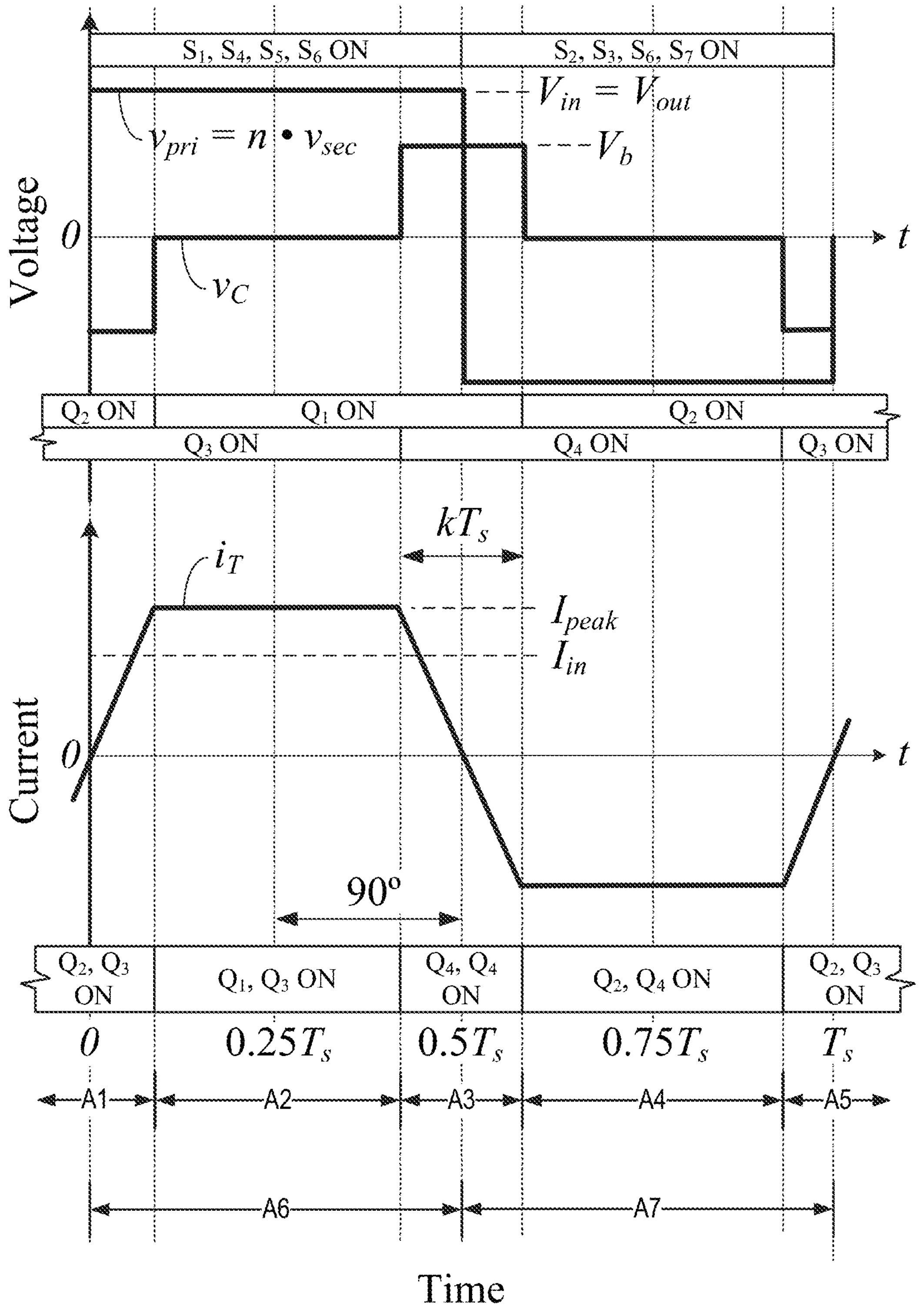
FIG. 11 illustrates example control timings for trapezoidal current modulation control in the DCX shown in FIG. 9 according to aspects of the embodiments.

FIG. 11 illustrates example control timings for trapezoidal current modulation control in the DCX 100 shown in FIG. 9. The waveforms in FIG. 11 are shown over a period of time $T_s$, related to the switching frequency $f_s$. In FIG. 11, $v_{pri}$ is the voltage across the nodes A and B in the switching bridge 12 shown in FIG. 9, which is the same as the $v_{sec}$ voltage across the nodes C and D in the switching bridge 14, assuming a primary and secondary winding turns ratio of 1:1 in the EET 110. The $v_C$ is the voltage across an output of the coupling switch bridge 120. The current $i_T$ through the coupling switch bridge 120 of the EET 110 is also shown in FIG. 11.

For the time period A6, the DCX controller 130 can generate switching control signals to turn on the switching devices $S_1$, $S_4$, $S_5$, and $S_8$ and to turn off the switching devices $S_2$, $S_4$, $S_5$, and $S_8$, resulting in a positive voltage across the nodes A and B in the bridge 12 (and C and D in the bridge 14). For the time period A7, the DCX controller 130 generates switching control signals to turn on the switching devices $S_2$, $S_4$, $S_5$, and $S_8$ and to turn off the switching devices $S_1$, $S_4$, $S_5$, and $S_8$, resulting in a negative or reverse voltage across the nodes A and B in the bridge 12 (and C and D in the bridge 14).

Figure 12:
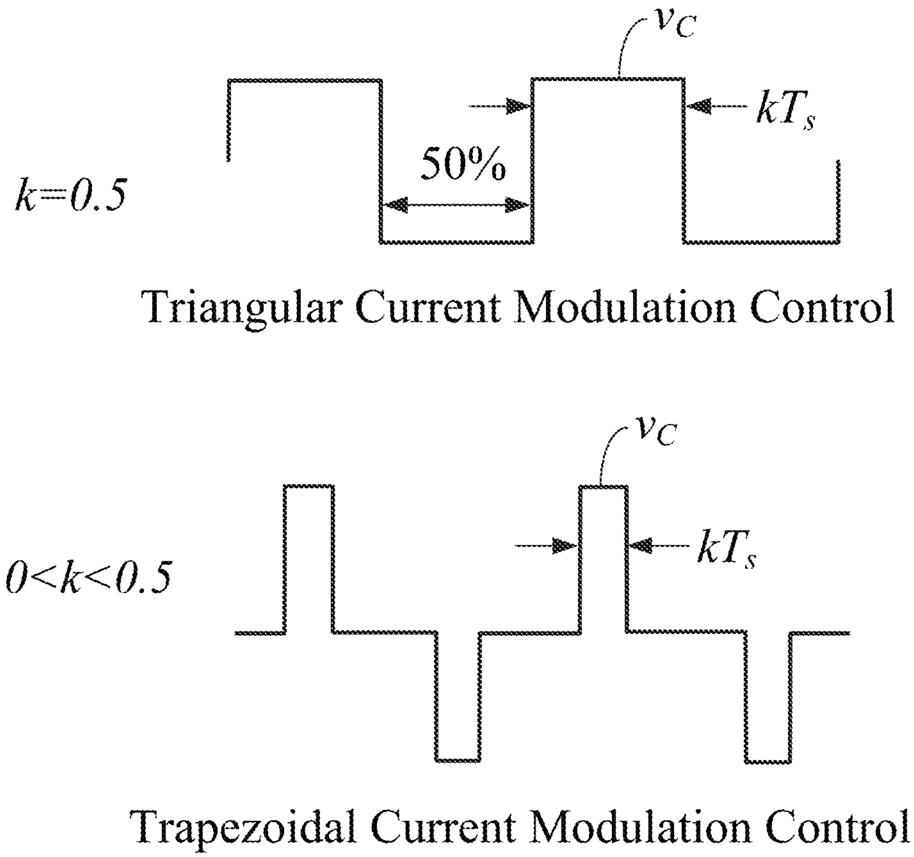
FIG. 12 illustrates example comparative waveforms for triangular and trapezoidal current modulation control of the DCX shown in FIG. 9 according to aspects of the embodiments.

The DCX controller 130 also generates phasing drive control signals for the switching devices $Q_1$-$Q_4$ in the coupling switch bridge 120 for trapezoidal current modulation control of the EET 110. To transform the $i_T$ current waveform from triangular, as shown in FIG. 10, to trapezoidal, as shown in FIG. 11, the DCX controller 130 is configured to introduce a zero-voltage stage ($Q_1$, $Q_3$ or $Q_2$, $Q_4$) to $v_C$, creating a "current plateau" as illustrated in FIG. 11. This plateau can be achieved by introducing a phase shift of kTs between the phase legs $Q_1$, $Q_2$, and $Q_3$, $Q_4$, as shown in FIG. 11. The extent of the phase shift can be set or determined by the DCX controller 130 based on a phase shift coefficient, k, which also controls the duty cycle of $v_C$, as illustrated in FIG. 12. FIG. 12 illustrates example comparative waveforms for triangular and trapezoidal current modulation control of the DCX 110.

The DCX controller 130 can set a value of k at between 0 to 0.5. In another example, the DCX controller 130 can set a value of k at between greater than 0 to less than 0.5. The DCX controller 130 can also vary the phase shift coefficient k during operation of the DCX 100. The DCX controller 130 can vary k during operation based on one or more operating aspects of the DCX 130, such as the input voltage $V_{in}$, the input current $I_{in}$, the output voltage $V_o$, the output current $I_{out}$, the power provided to a load $R_L$, and/or other operating metrics of the DCX 100. As a more particular example, the DCX controller 130 can decrease k for a lighter load and increase k for a higher load.

In the example shown in FIG. 11, the DCX controller 130 generates phasing drive control signals to turn on the switching devices $Q_2$ and $Q_3$ and to turn off the switching devices $Q_1$ and $Q_4$ for the time period A1. The DCX controller 130 generates phasing drive control signals to turn on the switching devices $Q_1$ and $Q_3$ and to turn off the switching devices $Q_2$ and $Q_4$ for the time period A2. The DCX controller 130 generates phasing drive control signals to turn on the switching devices $Q_1$ and $Q_4$ and to turn off the switching devices $Q_2$ and $Q_3$ for the time period A3. The DCX controller 130 generates phasing drive control signals to turn on the switching devices $Q_2$ and $Q_4$ and to turn off the switching devices $Q_1$ and $Q_3$ for the time period A4. The DCX controller 130 generates phasing drive control signals to turn on the switching devices $Q_2$ and $Q_3$ and to turn off the switching devices $Q_1$ and $Q_4$ for the time period A5. As shown in FIG. 11, the DCX controller 130 introduces a phase shift of kTs between the phase legs $Q_1$, $Q_2$, and $Q_3$, $Q_4$. The phase shift k can also be interpreted as the duty cycle of $v_C$, as illustrated in FIG. 12.

The coupling switch bridge 120 can still be directed by the DCX controller 130 to cancel the impedance produced by the leakage inductance $L_k$ by the switched coupling of the $v_C$ voltage in series with the leakage inductance $L_k$, at any switching frequency $f_s$, when using trapezoidal current modulation control. However, unlike the DCX 10, which has sinusoidal currents in the transformer 20 (see FIG. 7), the DCX 100 has trapezoidal currents in the EET 110. In any case, with the phase shift between the control of the coupling switch bridge 120 and the bridges 12 and 14, the current through the primary side of the EET 110 in the DCX 100 is still in phase with the voltage across the primary side of the EET 110. Additionally, the current through the secondary side of the EET 110 is still in phase with the voltage across the secondary side of the EET 110. Thus, only real power will be transferred from the input to the output of the DCX 100 and high efficiency can be obtained.

Figure 13:
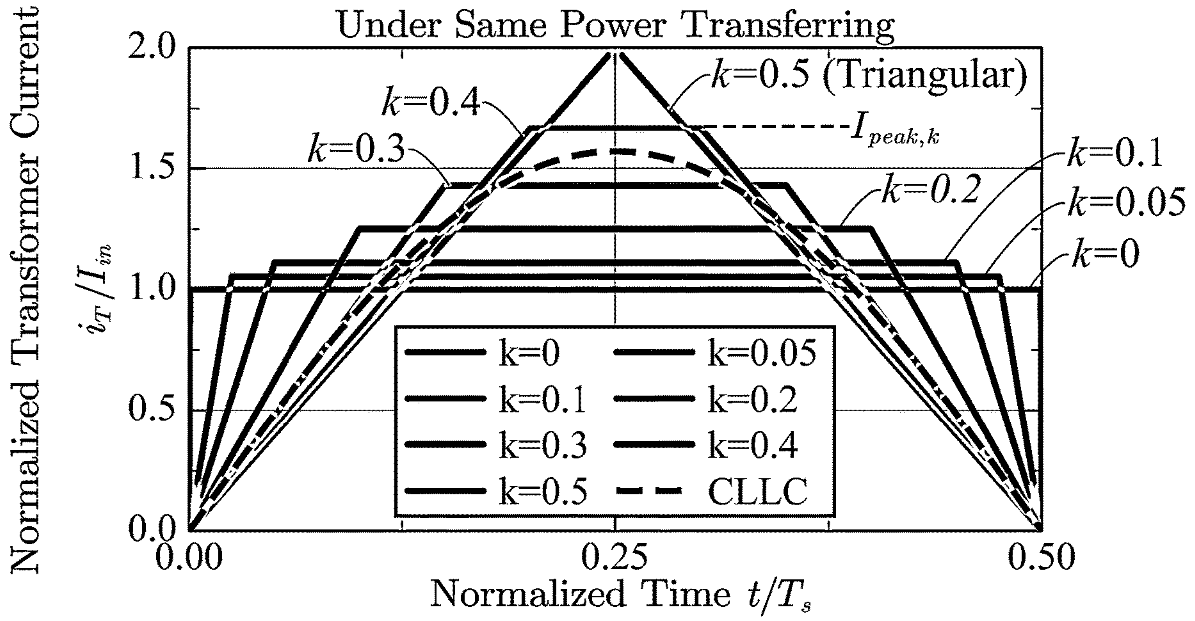
FIG. 13 illustrates normalized transformer current for various duty cycles under the condition of same power transfer for the DCX shown in FIG. 9 according to aspects of the embodiments.

FIG. 13 illustrates normalized transformer current $i_T/I_m$ for various duty cycles k under the condition of same power transfer for the DCX 100 shown in FIG. 9. When 0<k<0.5, the transformer current $i_T$ exhibits a trapezoidal waveform. At k=0, the current waveform transitions to the square waveform. Thus, triangular current modulation control can be regarded as a special case of trapezoidal current modulation control when k=0.5. Additionally, for comparison purposes, the resonant current from a CLLC-based DCX is represented as a dashed line in FIG. 13, assuming the same power rating.

Employing trapezoidal current modulation control, the peak current $I_{peak}$, rms transformer current $I_{T,rms}$, and voltage $V_b$ can be re-derived as follows:

$$I_{peak} = \frac{1}{1-k} \cdot I_{in}, \tag{4}$$

$$I_{T,rms} = \frac{1}{1-k} \cdot \sqrt{\frac{3-4 \cdot k}{3}} \cdot I_{in}, \text{ and} \tag{5}$$

$$V_b = \frac{2 f_s L_k}{(1-k)k} \cdot I_{in}. \tag{6}$$

When k=0.5, these results align with the findings in the '353 Application regarding triangle modulation.

Figure 14A:
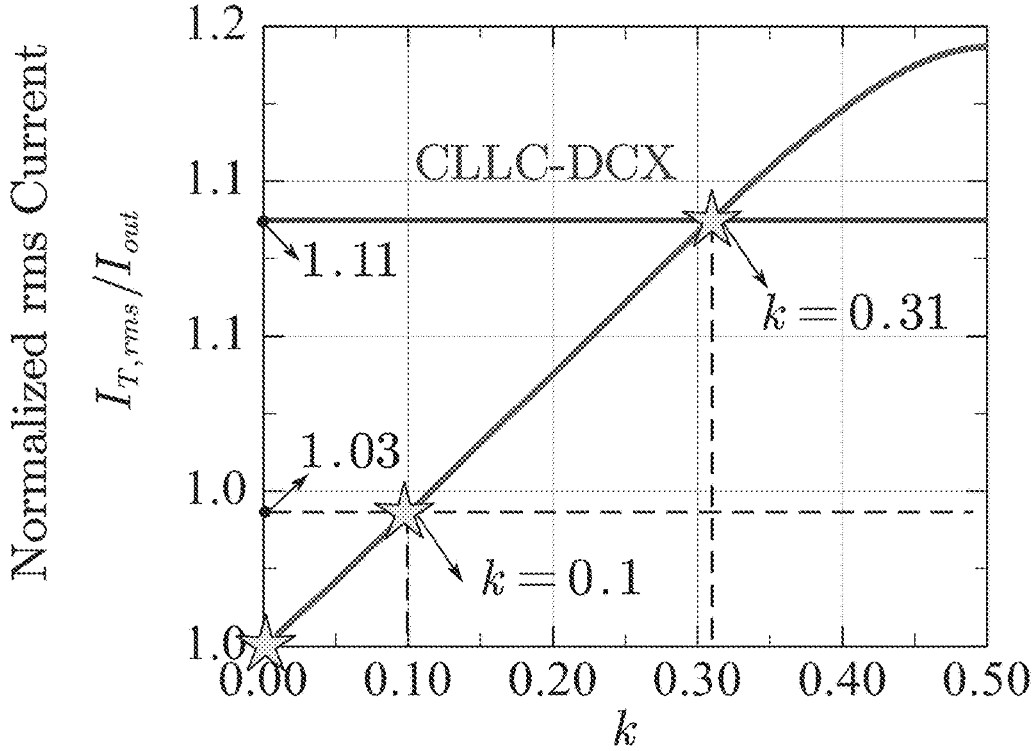
FIG. 14A illustrates transformer rms current $I_{T,rms}$ for the DCX shown in FIG. 9 according to aspects of the embodiments.

FIG. 14A illustrates transformer rms current $I_{T,rms}$ for the DCX shown in FIG. 9 according to aspects of the embodiments. Comparing $I_{T,rms}$ with the sinusoidal current observed in a CLLC-based DCX, the rms current can be reduced by 8% and 11% for k=0.1 and 0, respectively. Notably, for k=0.1, the rms current is significantly reduced by 13% compared to the triangle current modulation control at k=0.5. At k=0.31, the DCX 100 exhibits the same rms current as a CLLC-based DCX.

Figure 14B:
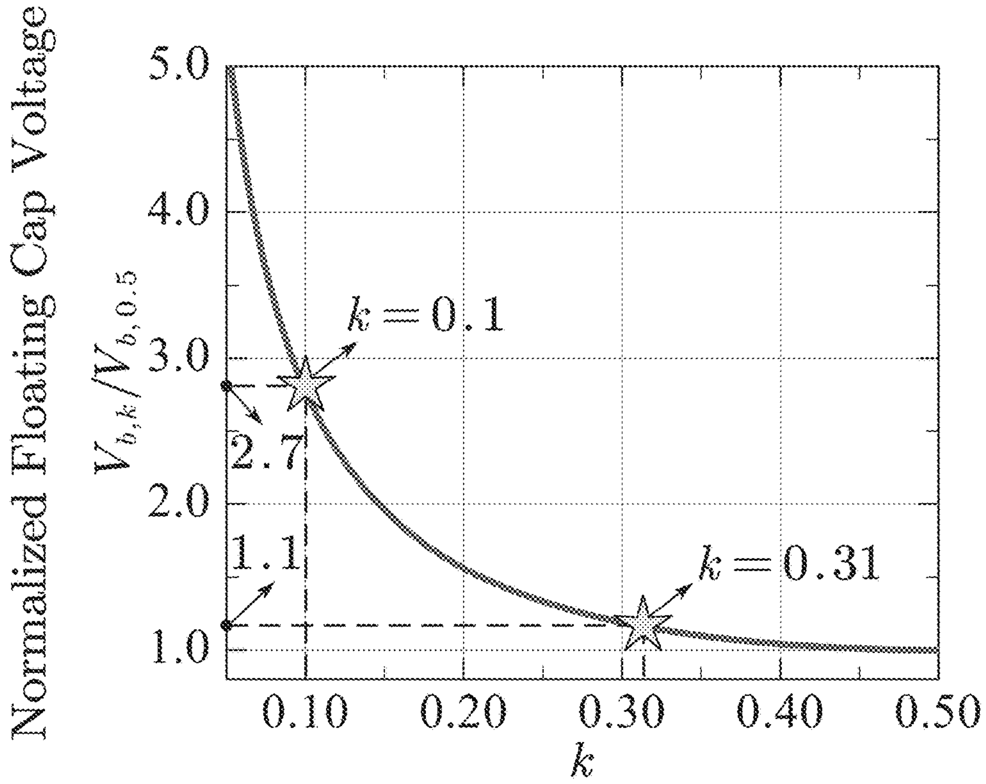
FIG. 14B illustrates floating capacitor voltage $V_b$ for the DCX shown in FIG. 9 according to aspects of the embodiments.

FIG. 14B illustrates floating capacitor voltage $V_b$ for the DCX shown in FIG. 9 according to aspects of the embodiments. Particularly, FIG. 14B illustrates the normalized voltage $V_b$ based on $V_{b,k=0.5}$ from Eq. (2). One drawback of trapezoidal current modulation control is that $V_b$ increases compared to triangular current modulation when k=0.5. For example, when k=0.31, 0.1, and 0.01, $V_b$ increases by 1.1, 2.7, and 5 times, respectively. Therefore, there is a trade-off. Particularly, as k approaches 0, the trapezoidal current becomes more like a square waveform with a smaller rms current, but it results in an increase in $V_b$ across the floating capacitor $C_b$. However, in practical scenarios, $V_b$ is typically very small. For instance, when k=0.1, $f_s$=250 kHz, $L_k$=200 nH, and $I_{in}$=10 A, the value of $V_b$ derived from Eq. (5) is approximately 10 V. This indicates that the increased $V_b$ is acceptable when it leads to a reduction in rms current.

Figure 15:
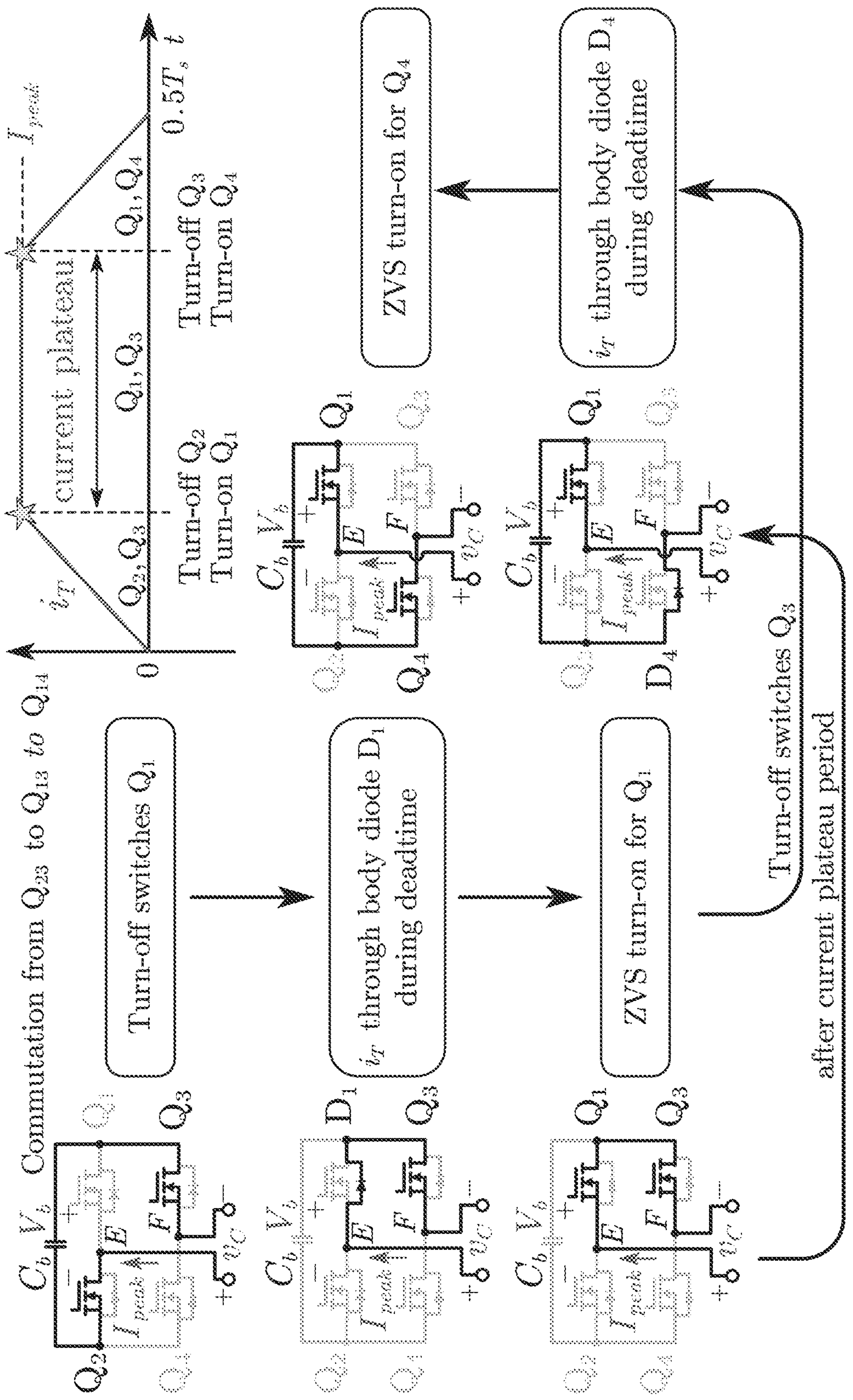
FIG. 15 illustrates a current commutation process and the realization of ZVS switching in the EET of the DCX shown in FIG. 9 according to aspects of the embodiments.

FIG. 15 illustrates a current commutation process and the realization of ZVS switching in the EET 110 of the DCX 100 shown in FIG. 9. First, ZVS is realized for the switching devices $Q_4$ and $Q_1$ in the coupling switch bridge 120. A similar mechanism applies to the other pair of switching devices, $Q_2$ and $Q_3$, during the other half period. Initially, during the transition from $Q_2$, $Q_3$ to $Q_2$, $Q_4$, switching device $Q_4$ achieves ZVS as the current $i_{peak}$ flows through the body diode $D_4$ before the switch turns on. Following the current plateau stage (zero stage $Q_2$, $Q_4$), switching device $Q_1$ achieves ZVS using the same process. Achieving ZVS in the coupling switch bridge 120 is independent of the load, since both $i_{peak}$ and $V_b$ are proportionate to the input current $I_{in}$, as determined by Eqs. (4) and (6). Even under light load conditions, where $i_{peak}$ decreases, the $v_C$ voltage across the coupling switch bridge 120 also decreases, ensuring that the $i_{peak}$ during the dead time is sufficient to achieve ZVS in the coupling switch bridge 120.

Figure 16:
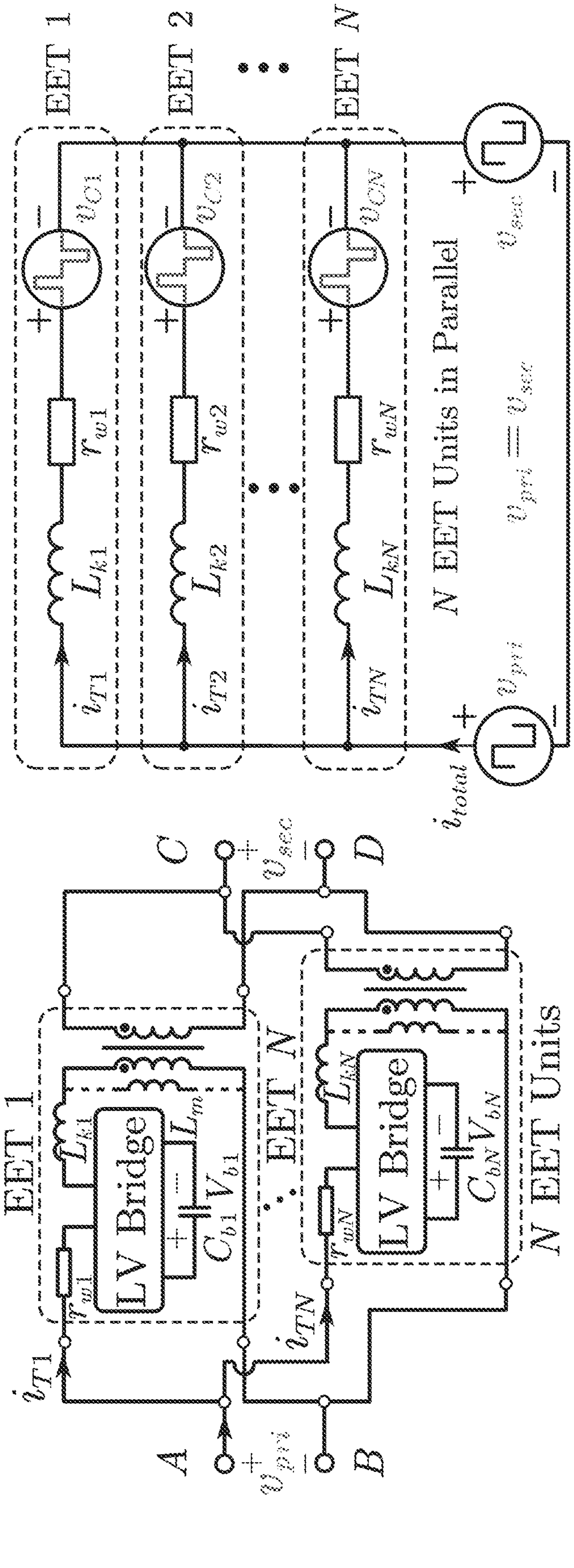
FIG. 16 presents a transformer-level parallel configuration with multiple EET units and a simplified equivalent circuit according to aspects of the embodiments.

FIG. 16 presents a transformer-level parallel configuration with multiple EET (left pane) units and a simplified equivalent circuit (right pane) according to aspects of the embodiments. Each EET unit is associated with a winding resistance $r_{wN}$. Despite the introduction of a zero stage in $v_{CN}$, the fundamental component of $v_{CN}$ still exhibits a 90-degree phase difference from $v_{pri}$ Or $v_{sec}$. Consequently, the impedance of the leakage inductance $L_{kN}$ can be effectively canceled out by each coupling switch bridge in series.

Figure 17:
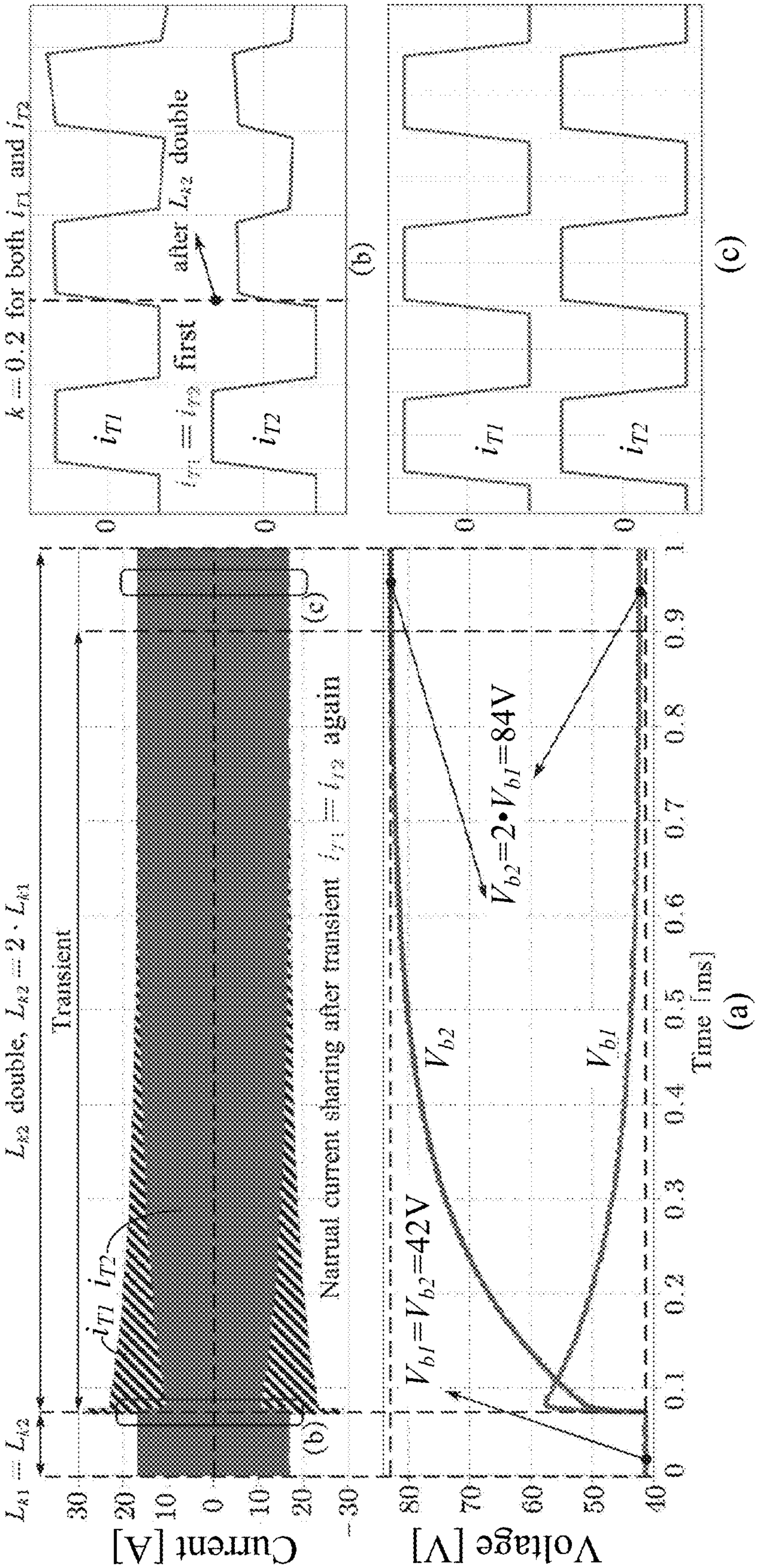
FIG. 17 illustrates results of a simulation according to aspects of the embodiments.

FIG. 17 illustrates results of a simulation with parameters k=0.2, $f_s$=250 kHz, $V_{in}$=$V_{out}$=300 V, $L_{k1(2)}$=200 nH, and $I_{in}$=$I_{out}$=30 A. Good current sharing is evident due to the equality of $L_{k1}$ and $L_{k2}$, as observed from $v_{C1}$=$v_{C2}$=21 V (derived from Eq. (6)). At approximately 0.08 ms, a doubling of $L_{k2}$ causes a temporary drop in current $i_{T2}$. However, after a transient period, $v_{C2}$ automatically adjusts to double its value, ensuring that $i_{T1}$=$i_{T2}$ is maintained, thereby confirming the natural current sharing characteristic of the trapezoidal current modulation control.

To validate the analysis of trapezoidal modulation, a practical implementation of a 12 KW EET-based converter system was constructed. The system includes four EET units operating in parallel. Detailed parameters of the system can be found in Table I.

TABLE I

| Variable | Value | Variable | Value |
|---|---|---|---|
| $V_{in(out)}$ | 300 V | $C_b$ | 20 μF |
| P | 12 kW | $f_s$ | 250 kHz |
| $L_k$ | 184 nH | $Q_1$-$Q_4$ | 80 V |
| | | Switches | EPC 2029 |

Figure 18A:
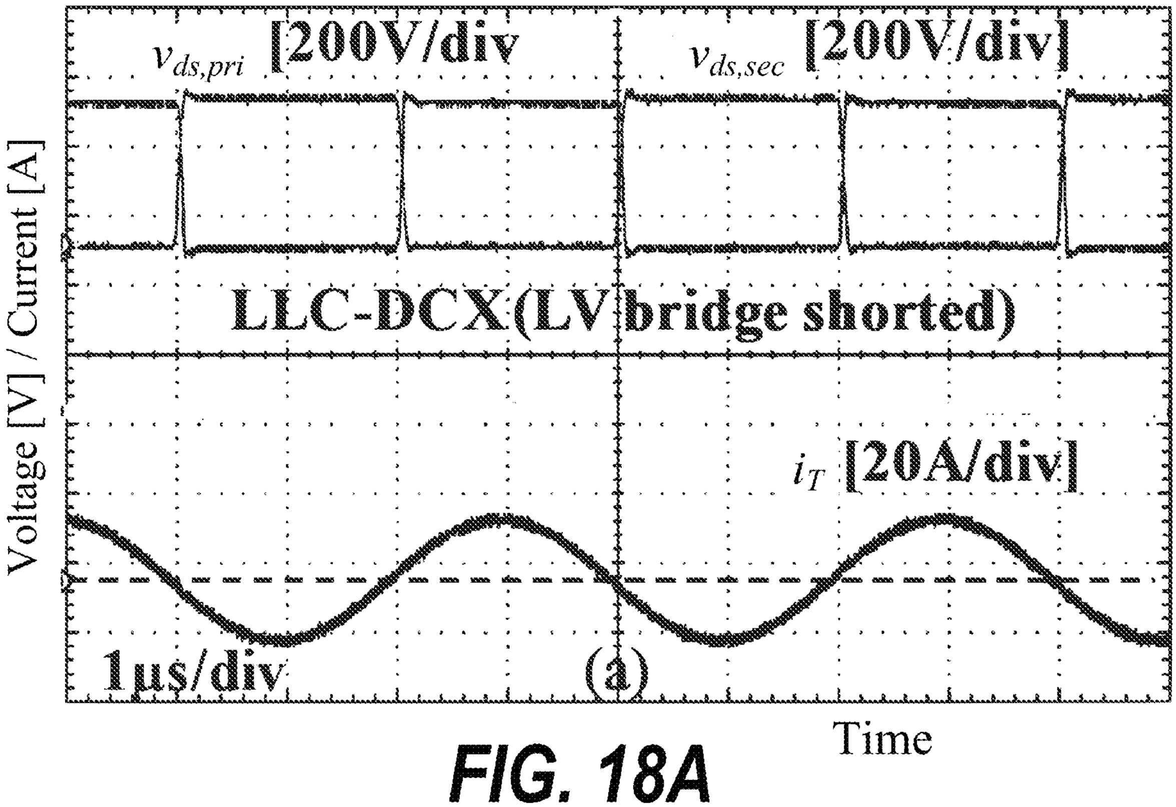
FIGS. 18A-18D illustrates experimental results of an example implementation of an EET-based DCX converter according to aspects of the embodiments.
Figure 18B:
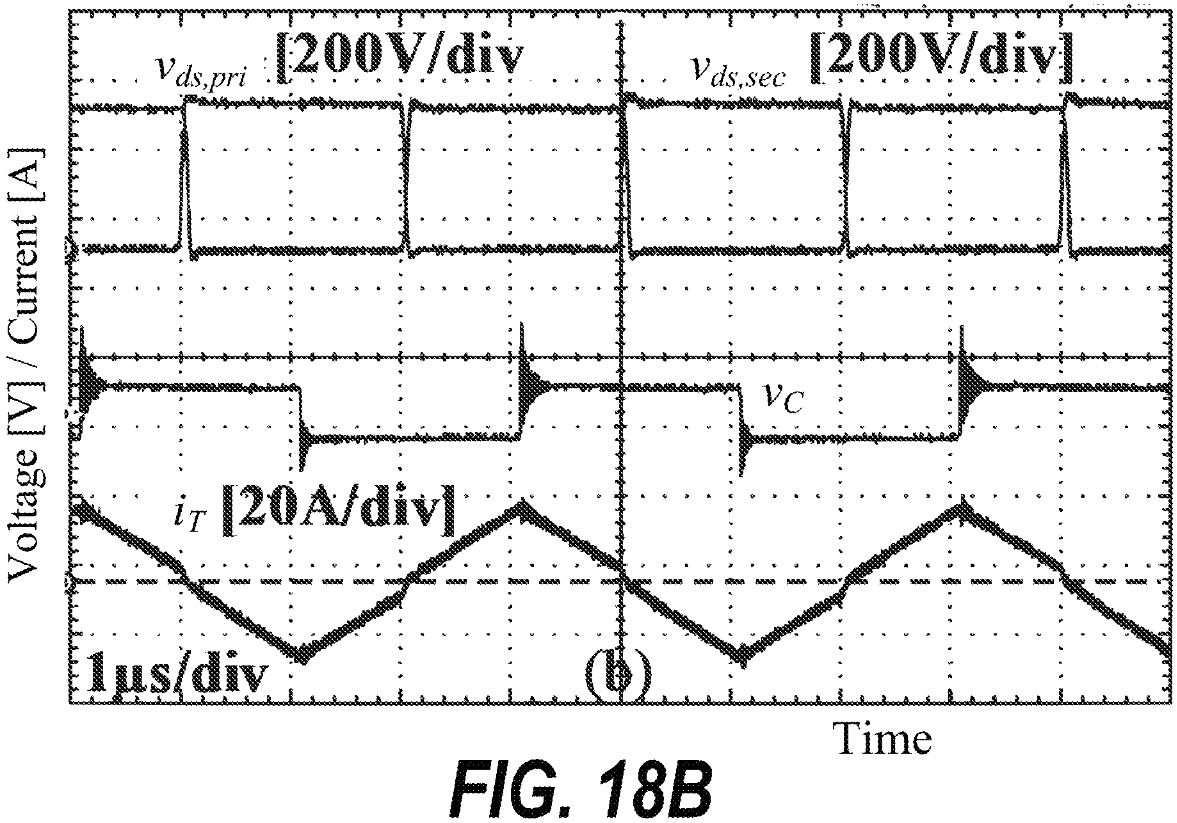
Figure 18C:
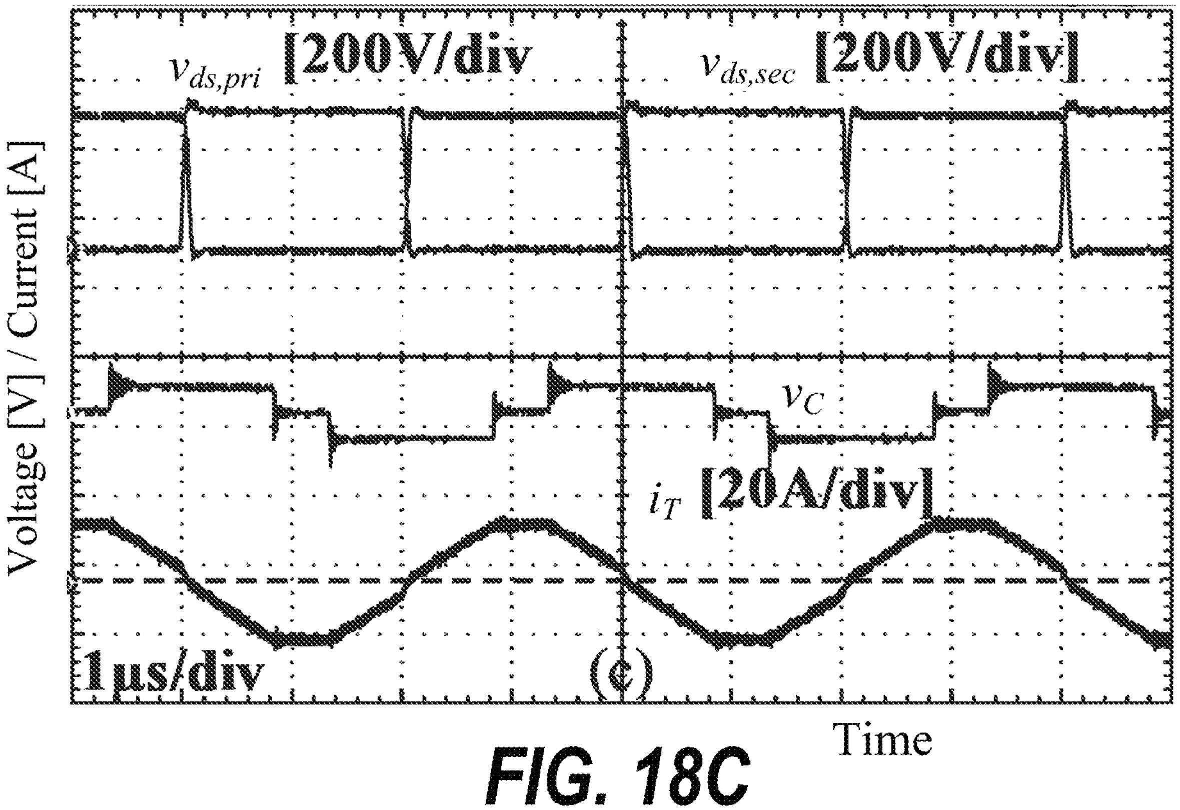
Figure 18D:
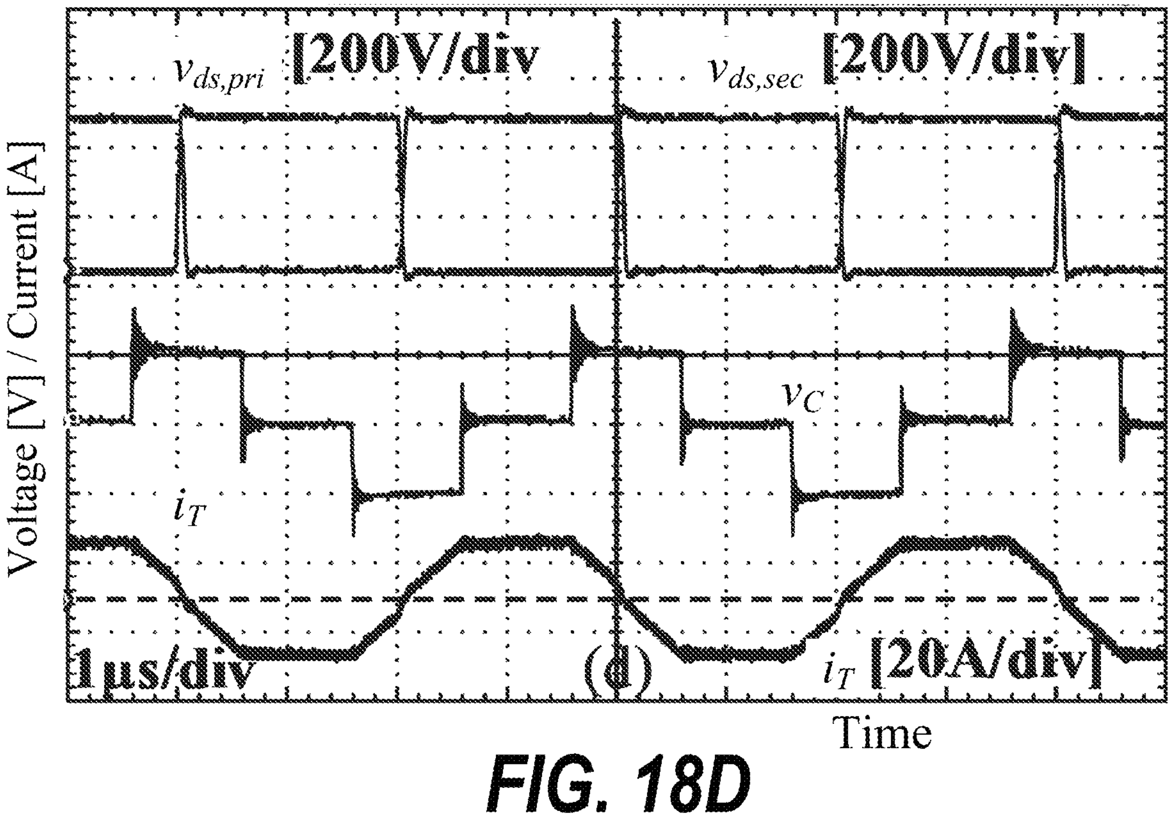

FIGS. 18A-18D illustrates experimental results of the 12 KW EET-based DCX converter system operating at a load of 3 KW. FIG. 18A illustrates $v_{ds,\ pri}$ (see FIG. 9), $v_{ds,\ sec}$ (see FIG. 9), and $i_T$ waveforms of the EET-based converter system, where the coupling switch bridge in the EET was shorted, and an external resonant capacitor was incorporated. In FIGS. 18A-18C, the same waveforms for trapezoidal current modulation control with k values of 0.5, 0.4, and 0.3 are displayed, respectively. As anticipated from the previous analysis, when k=0.5, the $i_T$ current waveform takes the shape of a triangle, while reducing k moves the waveforms closer to a square waveform, resulting in a smaller rms value as predicted by Eq. (5). Furthermore, as k decreases, $V_b$ increases.

Figure 19A:
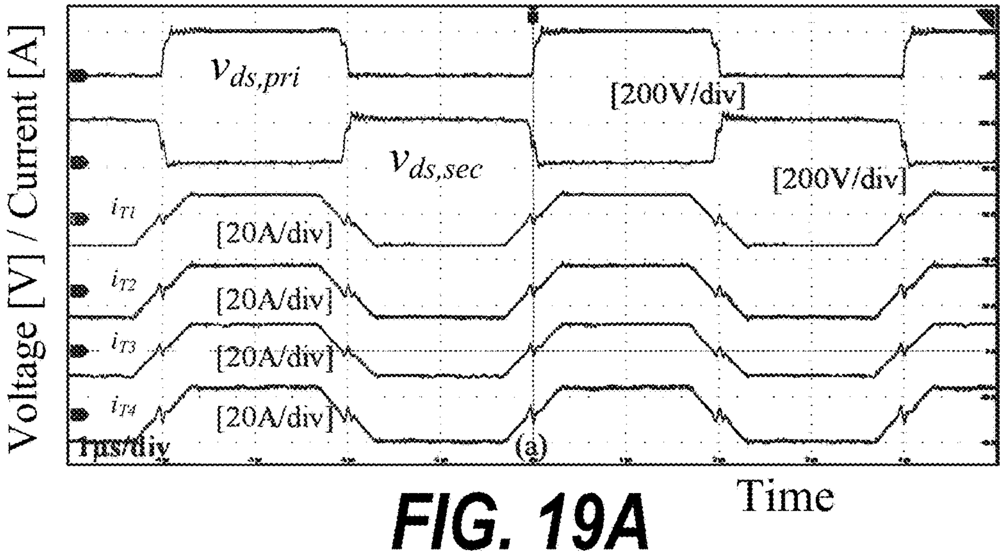
FIGS. 19A-C illustrate experimental results of current sharing in the example implementation of an EET-based DCX converter when operating at full load according to aspects of the embodiments.
Figure 19B:
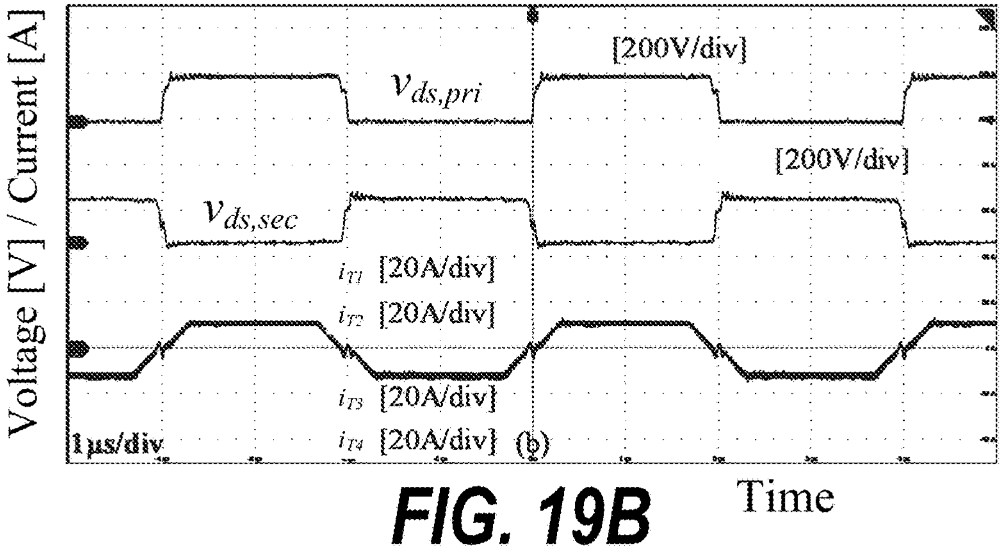
Figure 19C:
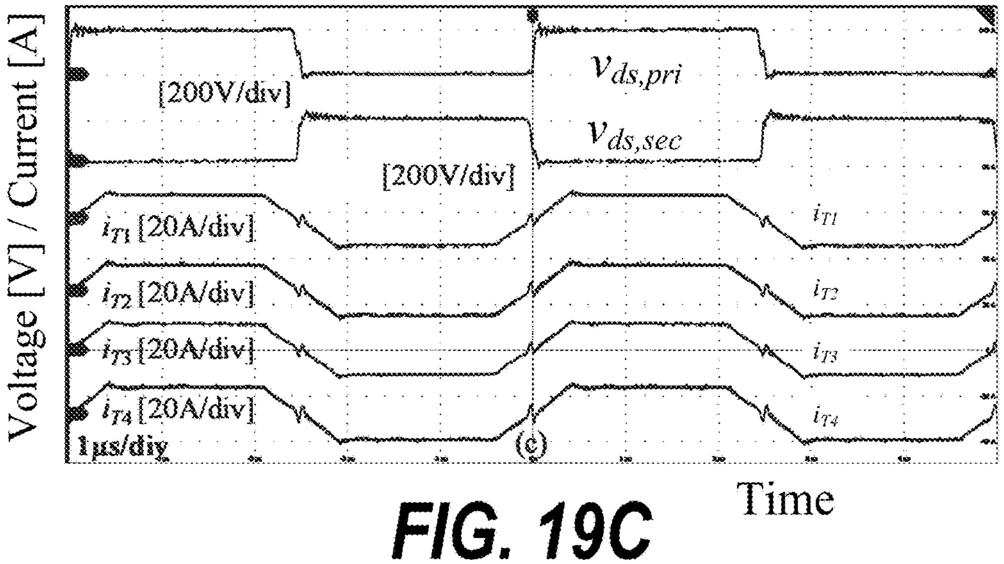

FIGS. 19A-C illustrate experimental results of current sharing in the example implementation of an EET-based DCX converter when operating at full load of 12 kW with four EET units in parallel. In FIGS. 19A and 19B, it can be observed that at a switching frequency of 250 kHz with k=0.2, the current sharing is excellent, with $i_{T1\text{-}4}$ closely matching each other after overlapping. Similarly, FIG. 19C demonstrates the favorable current sharing results when the switching frequency is adjusted from 250 to 200 kHz while maintaining k at 0.2. Unlike in an LLC-based DCX, which necessitates resonant point tuning, the EET-based DCX employing trapezoidal current modulation control can achieve better performance at any frequency.

Figure 20:
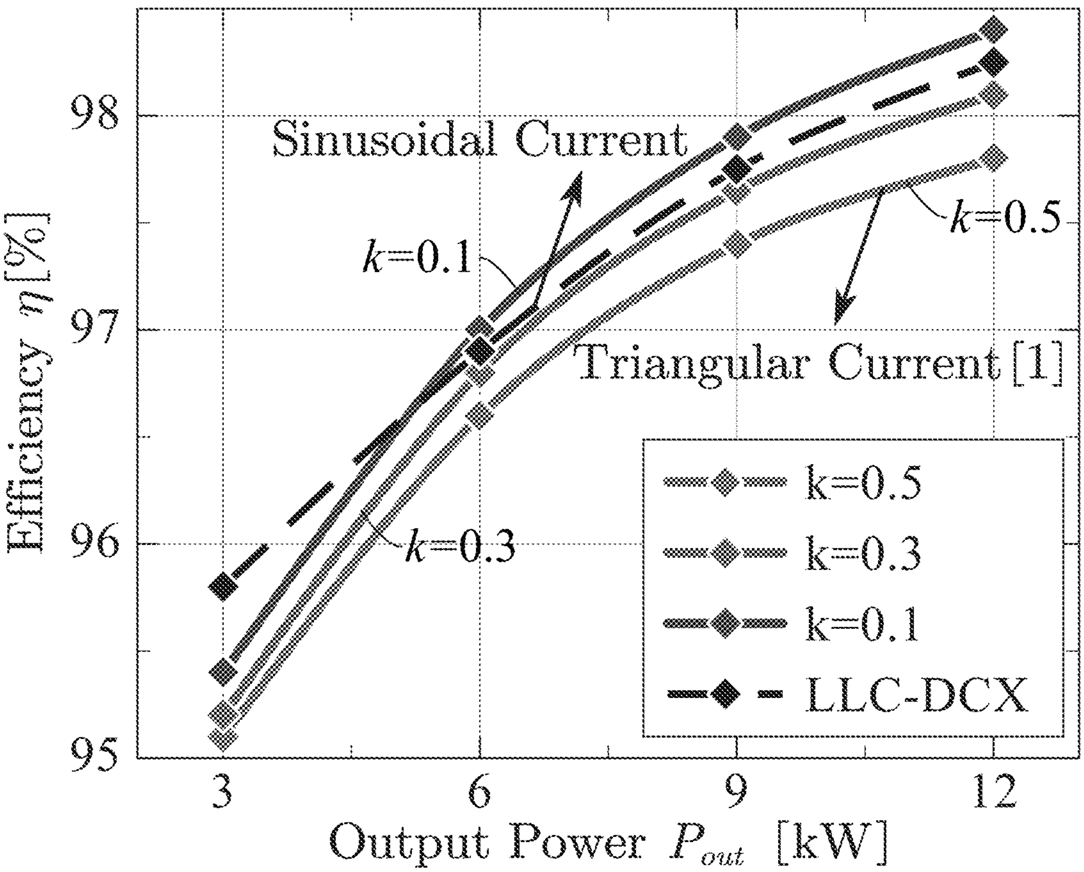
FIG. 20 illustrates example efficiency results of an EET-based DCX converter according to aspects of the embodiments.

FIG. 20 illustrates example efficiency results of an EET-based DCX converter for various values of k according to aspects of the embodiments. To provide a benchmark, the efficiency of the resonant LLC-DCX (98.25% at 12 KW) is included. When k=0.5, the triangular current waveform still exhibits a higher rms current compared to the sinusoidal current of the LLC-DCX. However, as k approaches 0, for instance, when k=0.1, the EET-based DCX achieves a higher efficiency (e.g., 98.4% at 12 kW) due to the reduced rms current and total conduction loss. It is important to highlight that this reduction in conduction loss not only applies to the transformer windings but also encompasses the conduction loss of the high voltage bridge devices. This aspect is particularly advantageous in high-current, high-power applications, as the additional loss on the low voltage bridge in the EET becomes less significant in comparison.

Figure 21:
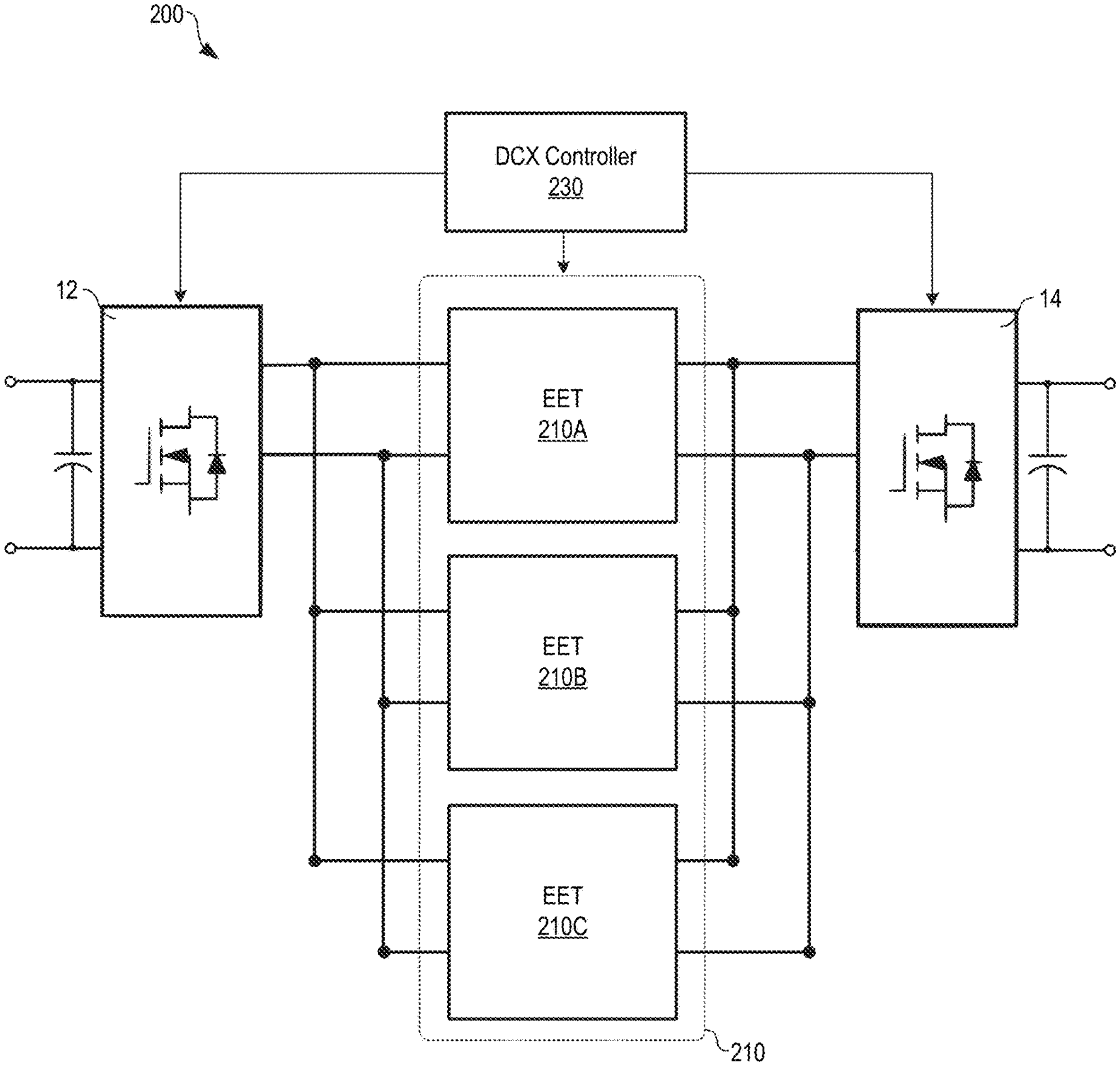
FIG. 21 illustrates an example of a DCX with a parallel arrangement of EETs according to aspects of the embodiments.

The trapezoidal current modulation control techniques described herein can be extended to parallel and serial arrangements of EETs in a DCX converter. FIG. 21 illustrates an example of a DCX 200 with a parallel arrangement of electronic-embedded transformers according to aspects of the embodiments. The DCX 200 is illustrated as a representative example. The DCX 200 can vary as compared to that shown. For example, the DCX 200 can include other components that are not illustrated in FIG. 21, such as additional EETs, and the DCX 200 can omit one or more of the components that are illustrated in FIG. 21. The switching devices, transformers, controllers, and other components in the DCX 200 can be embodied as described herein or using other suitable devices (e.g., other types of transistors, transformers, controllers, etc.), as the DCX 200 is not limited to being implemented with any particular type or style of electronic components.

As shown, the DCX 200 includes the first or input switching bridge 12, the second or output switching bridge 14, EETs 210A-210C, and a DCX controller 230. Each of the EETs 210A-210C is similar to the EET 110 shown in FIG. 9. The EETs 210A-210C are coupled in parallel between the first and second switching bridges 12 and 14 and, collectively, form an electronically-controlled parallel transformer 210 for high current applications. Although three EETs 210A-210C are shown, the DCX 200 can include any suitable number of EETs depending on the desired power handling (e.g., current handling) capacity of the DCX 200. Among possibly other components, each EET 210A-210C includes a series coupling bridge (e.g., with switching devices $Q_1$-$Q_4$ arranged in a full bridge) with capacitor $C_b$ in series with a resonant inductor $L_k$ and a primary transformer winding, as well as a secondary transformer winding.

The DCX controller 230 can be similar to the DCX controller 130 and embodied as processing circuitry, including memory, configured to control the operation of the DCX 200. In some cases, the DCX controller 230 can receive a metric or measure of one or more of the input voltage $V_{in}$, the input current $I_{in}$, the output voltage $V_o$, output current $I_{out}$ or power provided to a load $R_L$ (not shown in FIG. 21), the operating frequency $f_s$, or other operating metrics of the DCX 200 as inputs, along with external control inputs.

The DCX controller 230 is configured to generate drive or switching control signals for the first and second switching bridges 12 and 14 at a switching frequency $f_s$. The switching control signals direct the operation of the switching bridges 12 and 14 to transfer power between the input and the output of the DCX 200. The DCX controller 230 is also configured to generate phasing drive control signals based on trapezoidal current modulation control for the switching devices in the coupling switch bridge of each EET 210A-210C. The phasing drive control signals can also be generated at the switching frequency $f_s$, but they are offset according to the trapezoidal current modulation control concepts described herein. The same phasing drive control signals can be provided to each EET 210A-210C in one example.

The DCX 200 offers an improvement as compared to the DCX 60 shown in FIG. 8 and described above. Particularly, even if the transformers in the EETs 210A-210C have small differences among $L_k$ inductances in the EETs 210A-210C, the DCX controller 230 is configured to provide phasing drive control signals to the coupling switch bridges in the EETs 210A-210C, similar to that described above with reference to FIGS. 9 and 10. The coupling switch bridges in the EETs 210A-210C couple the voltages across each $C_b$ capacitance in the EETs 210A-210C to cancel the $L_k$ inductances in each EET 210A-210C according to the concepts described herein. With this control, the DCX 200 can operate with resonance at any switching frequency $f_s$.

In the DCX 60 shown in FIG. 8, the branch impedance of each transformer 20A-20C is a combination of the impedances of the series winding resistance $R_w$, the inductance $L_k$, and the capacitance $C_r$ of each transformer 20A-20C. This leads to current sharing issues when the branch impedances vary among the transformers 20A-20C, such as when manufacturing tolerances lead to different $L_k$ inductances among the transformers 20A-20C. In the DCX 200, the $L_k$ inductance in each EET 210A-210C is effectively canceled, leaving the branch impedance of each EET 210A-210C to be only the series winding resistance $R_w$ of each EET 210A-210C. The series winding resistances $R_w$ in the EETs 210A-210C are typically very low (e.g., in the range of tens of milliohms) and do not contribute significantly to current sharing issues or imbalances in the DCX 200.

Figure 22:
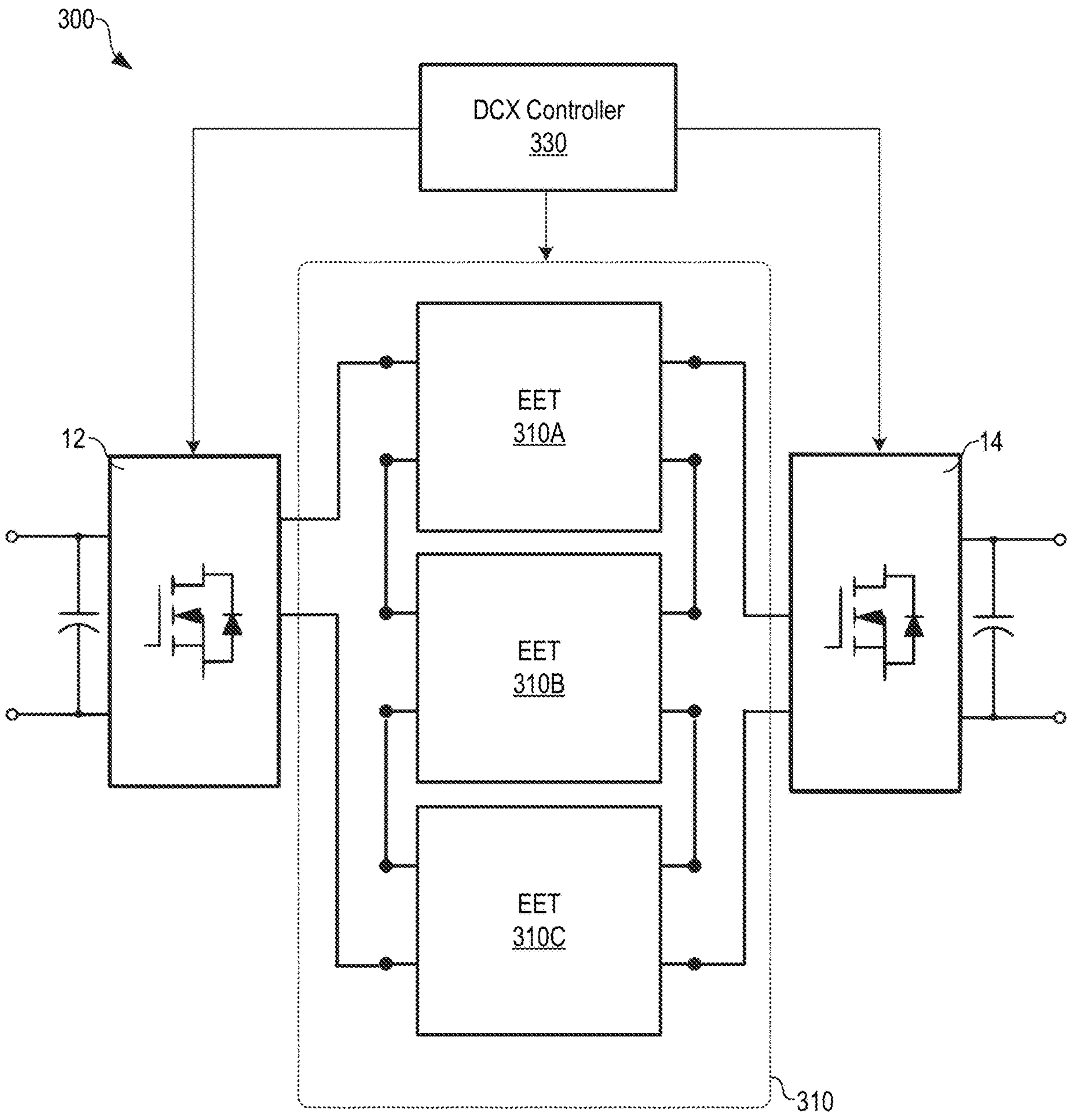
FIG. 22 illustrates an example of a DCX with a series arrangement of EETs according to aspects of the embodiments.

FIG. 22 illustrates an example of a DCX 300 with a series arrangement of electronic-embedded transformers according to aspects of the embodiments. The DCX 300 is illustrated as a representative example. The DCX 300 can vary as compared to that shown. For example, the DCX 300 can include other components that are not illustrated in FIG. 22, such as additional EETs, and the DCX 300 can omit one or more of the components that are illustrated in FIG. 22. The switching devices, transformers, controllers, and other components in the DCX 300 can be embodied as described herein or using other suitable devices (e.g., other types of transistors, transformers, controllers, etc.), as the DCX 300 is not limited to being implemented with any particular type or style of electronic components.

As shown, the DCX 300 includes the first or input switching bridge 12, the second or output switching bridge 14, EETs 310A-310C, and a DCX controller 330. Each of the EETs 310A-310C is similar to the EET 110 shown in FIG. 9. The EETs 310A-310C are coupled in series between the first and second switching bridges 12 and 14 and, collectively, form an electronically-controlled series transformer 310 for high voltage applications. Although three EETs 310A-310C are shown, the DCX 300 can include any suitable number of EETs depending on the desired power handling (e.g., voltage handling) capacity of the DCX 300. Among possibly other components, each EET 310A-310C includes a coupling switch bridge (e.g., with switching devices $Q_1$-$Q_4$ arranged in a full bridge) with capacitor $C_b$ in series with a resonant inductor $L_k$ and a primary transformer winding, as well as a secondary transformer winding.

The DCX controller 330 can be similar to the DCX controller 130 and embodied as processing circuitry, including memory, configured to control the operation of the DCX 300. In some cases, the DCX controller 330 can receive a metric or measure of one or more of the input voltage $V_{in}$, the input current $I_{in}$, the output voltage $V_o$, output current $I_{out}$ or power provided to a load $R_L$ (not shown in FIG. 22), the operating frequency $f_S$, or other operating metrics of the DCX 300 as inputs, along with external control inputs.

The DCX controller 330 is configured to generate drive or switching control signals for the first and second switching bridges 12 and 14 at a switching frequency $f_s$. The switching control signals direct the operation of the switching bridges 12 and 14 to transfer power between the input and the output of the DCX 300. The DCX controller 330 is also configured to generate phasing drive control signals for the switching devices in the coupling switch bridge of each EET 310A-310C. The phasing drive control signals can also be generated at the switching frequency $f_s$, but they are offset according to the trapezoidal current modulation control concepts described herein. The same phasing drive control signals can be provided to each EET 310A-310C in one example.

The DCX 300 offers an improvement as compared to the DCX 60 shown in FIG. 8 and described above. Particularly, even if the transformers in the EETs 310A-310C have small differences among $L_k$ inductances in the EETs 310A-310C, the DCX controller 330 is configured to provide phasing drive control signals to the coupling switch bridges in the EETs 310A-310C, similar to that described above with reference to FIGS. 9 and 10. The coupling switch bridges in the EETs 310A-310C couple the voltages across each $C_b$ capacitance in the EETs 310A-310C to cancel the $L_k$ inductances in each EET 310A-310C according to the concepts described herein. With this control, the DCX 300 can operate with resonance at any switching frequency $f_s$.

Other embodiments can include combinations of the parallel transformer 210 shown in FIG. 21 and the series transformer 310 shown in FIG. 22. For example, a number of the series transformers 310 shown in FIG. 22 can be arranged in parallel with each other, similar to the way that the EETs 210A-210C shown in FIG. 21 are coupled in parallel with each other. This way, a power converter system can be implemented to have both high voltage and high current capabilities, while incorporating the benefits of EET-based current sharing and load-independent voltage gain described herein.

FIG. 23A illustrates an example of an EET module 600 according to aspects of the embodiments. The EET module 600 is illustrated as a representative example implementation of an EET according to the concepts described herein. The EETs described herein can be embodied in other ways and in other formats besides that shown in FIG. 23A. In the example shown, the EET module 600 includes a magnetic core having a first magnetic core section 610A and a second magnetic core section 610B. The EET module 600 also includes a printed circuit board (PCB) 620. The PCB 620 includes primary and secondary windings for a transformer of the EET module 600, implemented among layers of the PCB 620. Among other components, a resonant capacitor and a full bridge of switching devices can be mounted and electrically coupled to the PCB 620.

FIG. 23B illustrates an example of the EET module 600 shown in FIG. 23A, with the magnetic core omitted from view. FIG. 23B illustrates a number of devices 630 of a coupling switch bridge for the EET module 600, mounted on the PCB 620. The coupling switch bridge is similar to the coupling switch bridge 120 described above. For example, the devices 630 can include switching devices $Q_1$-$Q_4$ (e.g., transistors) (not individually referenced in FIG. 23A) arranged in a full bridge on the PCB 620. The switching devices $Q_1$-$Q_4$ can be relied upon for coupling a capacitor $C_b$ (not referenced) of the EET module 600 in series with a resonant inductor $L_k$ (not referenced) of the EET module 600. Because the voltages present across the devices 630 can be relatively low, the devices 630 can be relatively small and mounted on the PCB 620 as part of the EET module 600, as shown. With the full bridge arrangement of the devices 630, the series coupling bridge is capable of connecting the capacitor $C_b$ in series with the resonant inductor Lx based on drive control signals provided to the gates of the devices 630.

Figure 24:
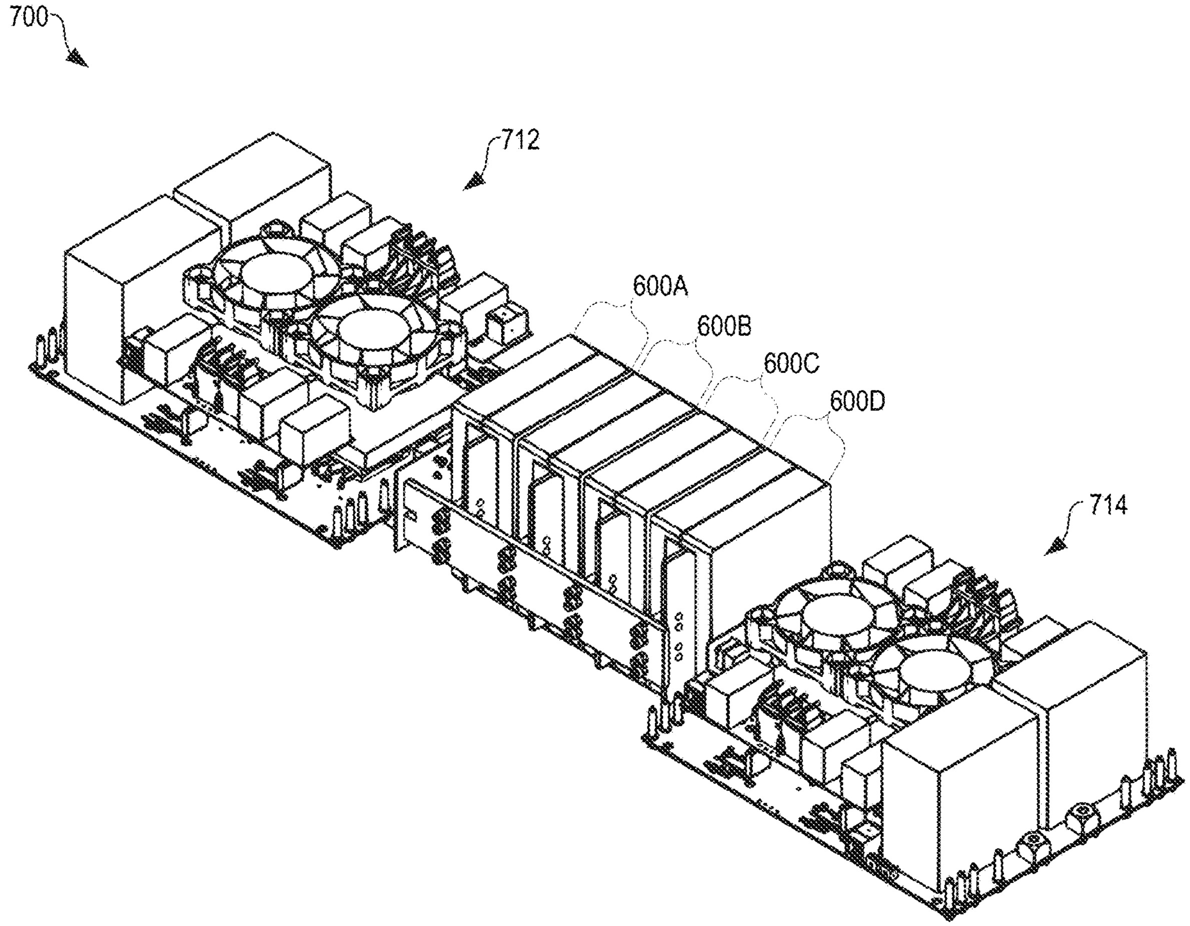
FIG. 24 illustrates an example power converter system including a number of the EET modules shown in FIG. 23A according to aspects of the embodiments.

FIG. 24 illustrates an example power converter system 700 including a number of the EET modules shown in FIG. 23A according to aspects of the embodiments. The system 700 is illustrated as a representative example according to the concepts described herein. The power converter systems described herein can be embodied in other ways and in other formats besides that shown in FIG. 24. As shown, the power converter system 700 includes a first or input switching bridge 712, a second or output switching bridge 714, and a transformer coupled between the bridges 712 and 714. The transformer is implemented as a number of EET modules, including EET modules 600A-600D. Each of the EET modules 600A-600D is similar to the EET module 600 shown in FIG. 15A. The EET modules 600A-600D are arranged in parallel between the switching bridges 712 and 714 in FIG. 24, although other arrangements, including series arrangements and series/parallel arrangements are within the scope of the embodiments.

Use of EET modules, such as the EET modules 600A-600D, provide flexibility in the design of power converter systems 700, including in DCX converters, among others. Any number of EET modules can be easily added in series or parallel arrangements, to increase the power handling capacity of a power converter system.

One or more microprocessors, microcontrollers, or DSPs can execute software to perform the control aspects of the embodiments described herein, such as the control aspects performed by the controller 70, the controller 130, the controller 230, or the controller 330. Any software or program instructions can be embodied in or on any suitable type of non-transitory computer-readable medium for execution. Example computer-readable mediums include any suitable physical (i.e., non-transitory or non-signal) volatile and non-volatile, random and sequential access, read/write and read-only, media, such as hard disk, floppy disk, optical disk, magnetic, semiconductor (e.g., flash, magneto-resistive, etc.), and other memory devices. Further, any component described herein can be implemented and structured in a variety of ways. For example, one or more components can be implemented as a combination of discrete and integrated analog and digital components.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A power converter system, comprising:

an input and an output;

a power converter between the input and the output, the power converter comprising:

a first bridge of switching devices;

a second bridge of switching devices; and an electronic-embedded transformer between the first bridge and the second bridge, the electronic-embedded transformer comprising a capacitance coupling switch bridge of switching devices (Q1), (Q2), (Q3), and (Q4) arranged in a full bridge; and a controller configured to generate phasing drive control signals that introduce a phase shift between phase legs of the switching devices (Q1), (Q2), (Q3), and (Q4) based on a phase shift coefficient, (k), and introduce a current plateau and zero-voltage stage among the switching devices (Q1), (Q2), (Q3), and (Q4) for trapezoidal current modulation control of the capacitance coupling switch bridge, wherein:

the electronic-embedded transformer further comprises a capacitor coupled among the full bridge of switching devices in the capacitance coupling switch bridge; and the capacitance coupling switch bridge is arranged to couple the capacitor in series with an inductance of the electronic-embedded transformer based on the phasing drive control signals.

2. The power converter system according to claim 1, wherein the controller is further configured to generate switching control signals for the first bridge of switching devices and the second bridge of switching devices.

3. The power converter system according to claim 1, wherein:

the electronic-embedded transformer further comprises a capacitor coupled among the full bridge of switching devices (Q1), (Q2), (Q3), and (Q4) in the capacitance coupling switch bridge;

the phasing drive control signals control switching operations of the full bridge of switching devices (Q1), (Q2), (Q3), and (Q4) in the capacitance coupling switch bridge; and the controller is further configured to generate the phasing drive control signals based on the phase shift coefficient, (k), to set a duty cycle of the capacitance coupling switch bridge.

4. The power converter system according to claim 3, wherein the controller is configured to vary the phase shift coefficient, (k), from between 0 to 0.5.

5. The power converter system according to claim 3, wherein the controller is configured to vary the phase shift coefficient, (k), from between 0 to 0.5 based on a load applied to the power converter system.

6. The power converter system according to claim 1, wherein the electronic-embedded transformer comprises a module in the power converter.

7. The power converter system according to claim 1, wherein the electronic-embedded transformer comprises a plurality of electronic-embedded transformers coupled in parallel between the first bridge and the second bridge.

8. The power converter system according to claim 1, wherein the electronic-embedded transformer comprises a plurality of electronic-embedded transformers coupled in series between the first bridge and the second bridge.

9. An electronic-embedded transformer for a power converter, comprising:

a primary winding;

a secondary winding;

a resonant inductor for use in the power converter, the resonant inductor being embodied as leakage inductance among the primary winding and the secondary winding;

a capacitance coupling switch bridge of switching devices (Q1), (Q2), (Q3), and (Q4) arranged in a full bridge; and a controller configured to generate phasing drive control signals that introduce a phase shift between phase legs of the switching devices (Q1), (Q2), (Q3), and (Q4) based on a phase shift coefficient, (k), and a current plateau and zero-voltage stage among the switching devices (Q1), (Q2), (Q3), and (Q4) for trapezoidal current modulation control of the capacitance coupling switch bridge, wherein:

the capacitance coupling switch bridge comprises a capacitor coupled among the full bridge of switching devices in the capacitance coupling switch bridge; and the capacitance coupling switch bridge is arranged to couple the capacitor in series with the resonant inductor based on the phasing drive control signals.

10. The electronic-embedded transformer according to claim 9, wherein the phasing drive control signals control switching operations of the full bridge of switching devices (Q1), (Q2), (Q3), and (Q4) in the capacitance coupling switch bridge.

11. The electronic-embedded transformer according to claim 9, wherein the controller is further configured to generate the phasing drive control signals based on the phase shift coefficient, (k), to set a duty cycle of the capacitance coupling switch bridge.

12. The electronic-embedded transformer according to claim 11, wherein the controller is configured to vary the phase shift coefficient, (k), from between 0 to 0.5.

13. The electronic-embedded transformer according to claim 11, wherein the controller is configured to vary the phase shift coefficient, (k), from between 0 to 0.5 based on a load applied to the power converter.

14. The electronic-embedded transformer according to claim 9, wherein the electronic-embedded transformer comprises a module in the power converter.

15. A power converter system, comprising:

a power converter comprising:

a first bridge of switching devices;

a second bridge of switching devices; and an electronic-embedded transformer between the first bridge and the second bridge, the electronic-embedded transformer comprising a capacitor and a capacitance coupling switch bridge of switching devices (Q1), (Q2), (Q3), and (Q4) arranged in a full bridge; and a controller configured to:

generate switching control signals for the first bridge of switching devices and the second bridge of switching devices; and generate phasing drive control signals that introduce a phase shift between phase legs of the switching devices (Q1), (Q2), (Q3), and (Q4) based on a phase shift coefficient, (k), and a current plateau and zero-voltage stage among the switching devices (Q1), (Q2), (Q3), and (Q4) for trapezoidal current modulation control of the capacitance coupling switch bridge, wherein:

the electronic-embedded transformer further comprises a capacitor coupled among the full bridge of switching devices (Q1), (Q2), (Q3), and (Q4) in the capacitance coupling switch bridge; and the capacitance coupling switch bridge is arranged to couple the capacitor in series with an inductance of the electronic-embedded transformer based on the phasing drive control signals.

16. The power converter system according to claim 15, wherein:

the phasing drive control signals control switching operations of the capacitance coupling switch bridge; and the controller is further configured to generate the phasing drive control signals based on the phase shift coefficient, (k), to set a duty cycle of the capacitance coupling switch bridge.

17. The power converter system according to claim 16, wherein the controller is configured to vary the phase shift coefficient, (k), from between 0 to 0.5.

18. The power converter system according to claim 16, wherein the controller is configured to vary the phase shift coefficient, (k), from between 0 to 0.5 based on a load applied to the power converter system.

* * * * *